(12) United States Patent
Duan et al.

(10) Patent No.: US 12,732,521 B2
(45) Date of Patent: Sep. 8, 2026

(54) INLINE DETECT AND BLOCK RELAYED DNS TUNNELING TRAFFIC

(71) Applicant: Palo Alto Networks, Inc., Santa Clara, CA (US)

(72) Inventors: Ruian Duan, Fremont, CA (US); Shu Wang, San Jose, CA (US); Daiping Liu, Sunnyvale, CA (US); Fan Fei, Pleasanton, CA (US); Qi Zhang, Saratoga, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 8 days.

(21) Appl. No.: 18/894,907

(22) Filed: Sep. 24, 2024

(65) Prior Publication Data

US 2026/0089178 A1 Mar. 26, 2026

(51) Int. Cl.
*H04L 29/06* (2006.01)
*H04L 9/40* (2022.01)

(52) U.S. Cl.
CPC ...... *H04L 63/1425* (2013.01); *H04L 63/1416* (2013.01); *H04L 63/1466* (2013.01)

(58) Field of Classification Search
None
See application file for complete search history.

(56) References Cited

U.S. PATENT DOCUMENTS 9,794,229 B2 10/2017 Yu
10,097,568 B2 10/2018 Baughman
10,348,767 B1 * 7/2019 Lee ..................... H04L 63/1416
10,412,107 B2 9/2019 Brutzkus
11,606,385 B2 3/2023 Meyer
11,902,250 B2 2/2024 Moore
12,495,071 B2 * 12/2025 Sarakas ................... G06F 7/588
12,495,073 B2 * 12/2025 Kothari ............... H04L 63/1425
2018/0013775 A1 * 1/2018 Jee ...................... H04L 63/1416
(Continued)

FOREIGN PATENT DOCUMENTS

CN 103326894 9/2013

OTHER PUBLICATIONS

Alenezi, Rafa; Ludwig, Simone A. Classifying DNS Tunneling Tools For Malicious DoH Traffic. 2021 IEEE Symposium Series on Computational Intelligence (SSCI). https://ieeexplore.ieee.org/stamp/stamp.jsp?tp=&arnumber=9660136 (Year: 2021).*
(Continued)

*Primary Examiner* — Jeremiah L Avery
(74) *Attorney, Agent, or Firm* — Van Pelt, Yi & James LLP

(57) ABSTRACT

The present application discloses a method, system, and computer system for detecting DNS tunneling traffic. The method includes (i) obtaining non-DNS network traffic across an enterprise network, (ii) obtaining a hostname comprised in the non-DNS network traffic, (iii) querying a security service for a Domain Name System (DNS) tunneling attack verdict based at least in part on the hostname, (iv) determining whether the non-DNS network traffic is malicious traffic based at least in part on the DNS tunneling attack verdict, and (v) handling the non-DNS network traffic based at least in part on a determination of whether the non-DNS network traffic is malicious traffic based at least in part on the DNS tunneling attack verdict.

23 Claims, 12 Drawing Sheets

(56) References Cited

U.S. PATENT DOCUMENTS

| | | | | |
|---|---|---|---|---|
| 2018/0124072 | A1* | 5/2018 | Hamdi | G06F 21/577 |
| 2018/0124094 | A1* | 5/2018 | Hamdi | G06F 7/24 |
| 2019/0058718 | A1* | 2/2019 | Pangeni | H04L 63/1425 |
| 2020/0351244 | A1* | 11/2020 | Moore | H04L 63/0245 |
| 2020/0351245 | A1* | 11/2020 | Moore | H04L 47/2483 |
| 2020/0358858 | A1* | 11/2020 | Shribman | G06F 16/955 |
| 2020/0389469 | A1* | 12/2020 | Litichever | H04W 12/12 |
| 2022/0247678 | A1* | 8/2022 | Atwal | H04L 45/645 |
| 2022/0329442 | A1* | 10/2022 | Bulusu | H04L 63/1416 |
| 2023/0370495 | A1* | 11/2023 | Desai | H04L 63/1425 |
| 2024/0022600 | A1* | 1/2024 | Zhang | H04L 63/1466 |
| 2024/0205240 | A1* | 6/2024 | Duan | H04L 63/1466 |

OTHER PUBLICATIONS

Sanjay et al. DNS Amplification & DNS Tunneling Attacks Simulation, Detection and Mitigation Approaches. 2020 International Conference on Inventive Computation Technologies (ICICT). https://ieeexplore.ieee.org/stamp/stamp.jsp?tp=&arnumber=9112413 (Year: 2020).*

Boonyopakorn, Pongsarun; Changsan, Ukid. Malicious Traffic Detection in DNS Over HTTPS (DoH): Edge Prediction with Graph Convolutional Network. 2024 (ITC-CSCC). https://ieeexplore.ieee.org/stamp/stamp.jsp?tp=&arnumber=10628338 (Year: 2024).*

Nuojua et al. DNS Tunneling Detection Techniques—Classification, and Theoretical Comparison in Case of a Real APT Campaign. 2017.

Taner et al. Robust Edge Weight Synthesis for LPV Multi-Agent Systems with Integral Quadratic Constraints. Mar. 2023.

* cited by examiner

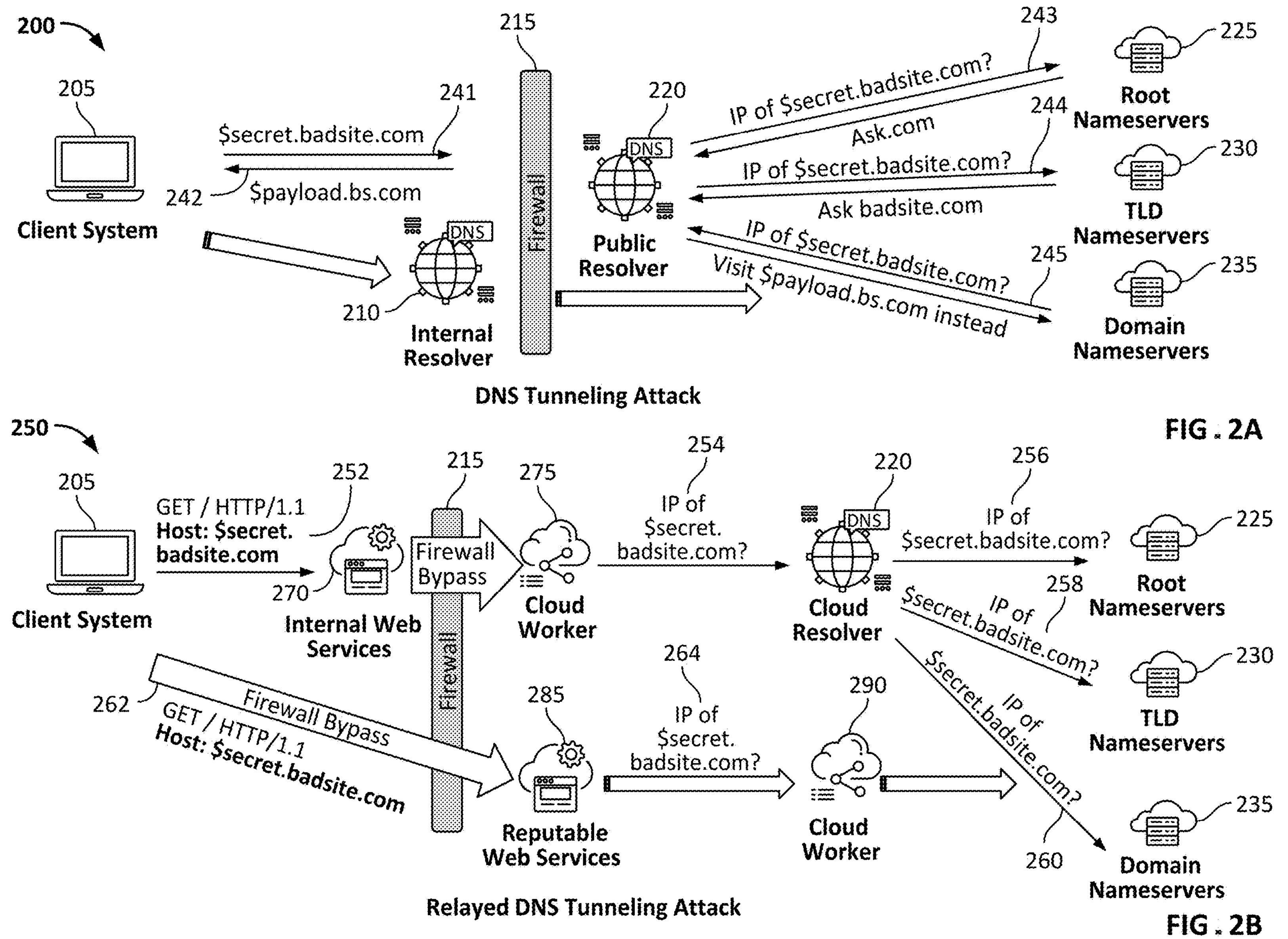
200
205
Client System
241
$secret.badsite.com
242
$payload.bs.com
DNS
210
Internal Resolver
215
Firewall
220
DNS
Public Resolver
243
IP of $secret.badsite.com?
Ask.com
244
IP of $secret.badsite.com?
Ask badsite.com
245
IP of $secret.badsite.com?
Visit $payload.bs.com instead
225
Root Nameservers
230
TLD Nameservers
235
Domain Nameservers
DNS Tunneling Attack
FIG. 2A
250
205
Client System
GET / HTTP/1.1
Host: $secret.
badsite.com
252
270
Internal Web Services
215
Firewall Bypass
Firewall
275
Cloud Worker
254
IP of
$secret.
badsite.com?
220
DNS
Cloud Resolver
256
IP of
$secret.badsite.com?
258
IP of
$secret.badsite.com?
IP of
$secret.badsite.com?
260
225
Root Nameservers
230
TLD Nameservers
235
Domain Nameservers
262
Firewall Bypass
GET / HTTP/1.1
Host: $secret.badsite.com
285
Reputable Web Services
264
IP of
$secret.
badsite.com?
290
Cloud Worker
Relayed DNS Tunneling Attack
FIG. 2B

500

610
GET / HTTP/1.1
Host:
5zw1rba9.i1iqfklh114tkhsqfwgs6chyxdwa9999.oamycksm562okt1zqh4shda9.claudfront[.]net
......
FIG. 6A
GET / HTTP/1.1
Host: dice.fldfs[.]com:443@2z28iqtzdtuc8qmlezohsvzujlphd8gw9mxck28r.oastify[.]com
FIG. 6B
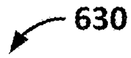
GET / HTTP/1.1
Host: coa0v2k001cm30i66d1gh8hq1bagygpre.mooo-ng[.]com
Vcip: co9uo173sbs6fg3cv3q0pi7e54f4kc5sp.mooo-ng[.]com
......
FIG. 6C

700

800

900

1000

1100

INLINE DETECT AND BLOCK RELAYED DNS TUNNELING TRAFFIC

BACKGROUND OF THE INVENTION

The Domain Name System (DNS) is a fundamental component of the internet, translating human-readable domain names into IP addresses that computers use to identify each other on the network. However, this essential service is increasingly being exploited by malicious actors to conduct various cyberattacks, including DNS tunneling, DNS hijacking, and DNS amplification attacks. DNS tunneling involves the use of DNS queries and responses to transmit data between a compromised system and an attacker-controlled server, effectively bypassing traditional security measures. This technique can be used for data exfiltration, command and control (C&C) communication, and other malicious activities. DNS hijacking, on the other hand, involves altering DNS records to redirect traffic to malicious sites, facilitating phishing attacks and malware distribution. DNS amplification attacks exploit the DNS protocol to launch large-scale Distributed Denial of Service (DDoS) attacks, overwhelming target systems with traffic.

Traditional security measures, such as firewalls and intrusion detection systems, often fail to detect these sophisticated DNS-based attacks due to the legitimate appearance of DNS traffic. As a result, there is a critical need for advanced detection mechanisms that can accurately identify and mitigate DNS exploits in real-time.

BRIEF DESCRIPTION OF THE DRAWINGS

Various embodiments of the invention are disclosed in the following detailed description and the accompanying drawings.

FIG. 2A is a block diagram of a system subject to a Domain Name System (DNS) tunneling attack.

FIG. 2B is a block diagram of a system subject to a relayed DNS tunneling attack via HTTP(S) network traffic according to various embodiments.

FIG. 6A is an example of a relayed DNS tunneling attack referred to as Decoy Dog that uses a fully qualified domain name (FQDN) embedded in the Host header of network traffic.

FIG. 6B is an example of a relayed DNS tunneling attack referred to as Burp Collaborator that uses an FQDN embedded in the Host header of network traffic.

FIG. 6C is an example of a relayed DNS tunneling attack referred to as Interactsh that uses an FQDN embedded in Host or VCIP headers.

DETAILED DESCRIPTION

Figure 1:
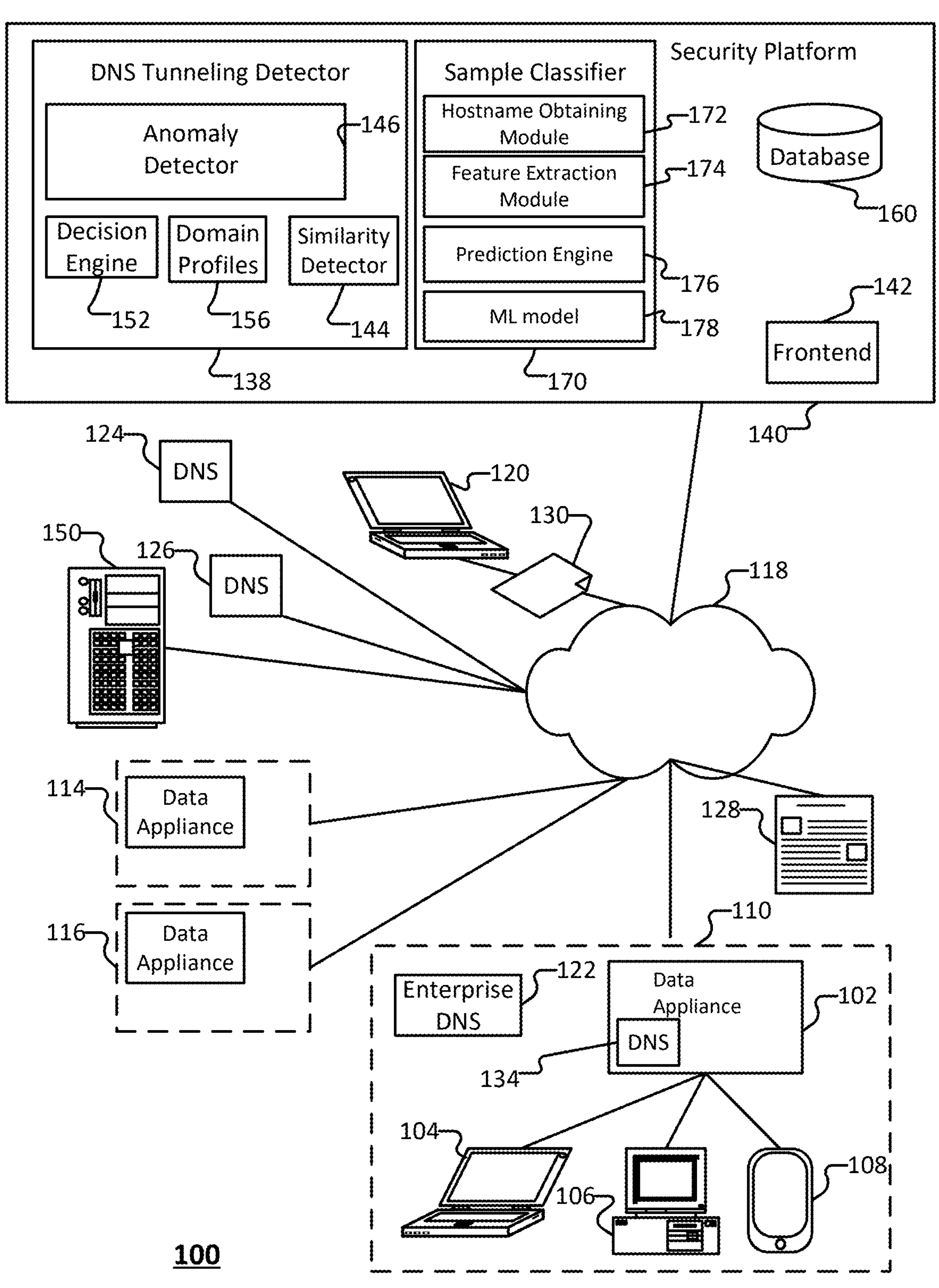
FIG. 1 is a block diagram of an environment for providing a security service to a network according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a security entity may be a network node (e.g., a device) that enforces one or more security policies with respect to information such as network traffic, files, etc. As an example, a security entity may be a firewall. As another example, a security entity may be implemented as a router, a switch, a Domain Name System (DNS) resolver, a computer, a tablet, a laptop, a smartphone, etc. Various other devices may be implemented as a security entity. As another example, a security entity may be implemented as an application running on a device, such as an anti-malware application or client used by an enterprise to manage the device.

DNS tunneling is a technique used by attackers to achieve command-and-control (C2) in campaigns such as DarkHydrus, OilRig, xHunt, SUNBURST and Decoy Dog. The key differentiating feature for DNS tunneling traffic compared to traditional malicious network traffic is that they abuse (1) relatively permissive security policies of enterprises for DNS traffic and (2) trusted resolvers as a proxy to route tunneling requests and responses towards attacker-controlled nameservers, which is the C2 server. At firewall level, DNS tunneling traffic can be detected by inspecting statistical patterns of DNS requests and responses and blocked by dropping tunneling-alike DNS requests and responses.

The primary challenge posed by DNS tunneling is its ability to evade detection. Conventional security systems are typically designed to monitor and filter standard traffic patterns, making them ill-equipped to identify the subtle and sophisticated nature of DNS tunneling attacks. As a result, unauthorized data can be transmitted without raising alarms, leading to potential breaches of sensitive information and compromising network integrity.

The increasing prevalence and sophistication of DNS tunneling attacks necessitate the development of more advanced detection mechanisms. There is a critical need for a solution that can accurately identify and mitigate these threats, ensuring robust protection for network infrastructures.

A new technique for DNS exploitation has emerged in which DNS tunneling traffic is relayed through non-DNS network traffic or non-DNS protocols (e.g., relayed DNS tunneling). This emergent DNS exploit allows malicious actors to covertly transmit data by embedding DNS queries within the header fields or payloads of internet or application traffic. As a result, this method may allow attackers to bypass traditional security measures, such as firewalls and intrusion detection systems, which often fail to recognize these disguised queries as malicious.

This emergent DNS exploit technique exploits the fact that reputable web services (e.g., https://example. com) may automatically resolve the hostnames specified in the web requests and essentially act as a proxy to route DNS tunneling requests towards attacker-controlled nameservers. The automatic resolution of untrusted hostnames by reputable web services can be considered as a new kind of server-side request forgery vulnerability, because it allows attackers to abuse their reputation and the underlying infrastructure (e.g., load balancer, worker, resolver) to evade detection by security vendors. Additionally, internal web services for a network can also have such vulnerabilities. Internal web services are special because they are usually hosted on internal IPs within the firewall and their outbound traffic is likely encoded or whitelisted, thus bypassing web traffic inspection at firewall level. Attackers can thus abuse the lack of internal web traffic visibility to evade detection by security vendors. In addition to abusing reputable web services and internal web services, the attackers can potentially abuse permissive security policies for hostnames specified in web traffic by setting up their own malicious web services (e.g., https://attacker-service.com) to relay DNS tunneling traffic. Malicious web services exploit the lack of cross-protocol threat prevention capabilities.

For HTTP traffic, DNS requests (or hostnames for which a service will attempt to resolve in connection with providing the service) can be embedded in various header fields. The Host header, which specifies the domain name of the server, can be manipulated to include DNS queries. Similarly, the User-Agent header, containing information about the client software, can be used to hide DNS requests. The Referer header, indicating the URL of the previous web page, is another potential field for embedding DNS queries. The X-Forwarded-For header, which specifies originating IP addresses of clients, can include hostnames instead of IPs and trigger DNS lookups. Additionally, cookies, which store arbitrary data, can be exploited to carry DNS queries back to the server.

In SMTP traffic, DNS requests (or hostnames for which a service will attempt to resolve in connection with providing the service) can be embedded in the subject line of an email, making them appear as part of the email's topic. The From and To headers, which specify the sender and recipient, can also be manipulated to include DNS queries. The body of the email, often disguised as legitimate text, is another common area for embedding DNS requests. Custom headers, such as X-Originating-IP or X-Mailer, can also be used to hide DNS queries within email traffic.

For TLS traffic, DNS requests (or hostnames for which a service will attempt to resolve in connection with providing the service), can be embedded in the Server Name Indication (SNI) field during the TLS handshake, which indicates the hostname the client is attempting to connect to. Fields within the TLS certificate, such as the Common Name (CN) or Subject Alternative Name (SAN), can also be manipulated to include DNS queries. Additionally, the Application-Layer Protocol Negotiation (ALPN) extension, which allows the application layer to negotiate the protocol used over a secure connection, can be exploited to embed DNS queries. QUIC traffic is similar to TLS traffic in its use of SNI and certificates. QUIC can be exploited in the same manner through hostname manipulation.

These methods allow attackers to disguise their malicious DNS queries as legitimate traffic, making detection more challenging.

Various embodiments provide a method, system, and computer system for detecting DNS tunneling traffic. The method includes (i) obtaining network traffic (e.g., web traffic, or non-DNS network traffic) across an enterprise network, (ii) obtaining a hostname comprised in the network traffic, (iii) querying a security service for a Domain Name System (DNS) tunneling attack verdict based at least in part on the hostname, (iv) determining whether the network traffic is malicious traffic based at least in part on the DNS tunneling attack verdict, and (v) handling the web traffic based at least in part on a determination of whether the network traffic is malicious traffic based at least in part on the DNS tunneling attack verdict.

According to various embodiments, the system detects and blocks DNS tunneling traffic relayed through non-DNS network traffic (e.g., embedded in headers of the non-DNS network traffic) based at least in part on (i) detecting network traffic (e.g., non-DNS network traffic, or web traffic) including requests and responses from network traffic (e.g., customer traffic associated with a particular enterprise network, etc.); (ii) decrypting the network traffic (e.g., using SSL decryption), if applicable; (iii) identify hostnames within network traffic and query a DNS cloud security service for a verdict (e.g., a prediction of whether the hostnames or corresponding domains are malicious, hijacked, etc.); (iv) determining whether (e.g., detecting if) the queried hostname is a tunneling query within the DNS cloud security service based at least in part on a result from a DNS tunneling detector; (v) returning tunneling verdict if the queried hostname is a tunneling query; and (vi) handling the network traffic based at least in part on the determination of whether the hostname is a tunneling query (e.g., dropping the network traffic via the security service if the queried hostname is a tunneling query). In some embodiments, the system additionally determines a compromised host (e.g., a client system within a particular enterprise network) and notifies a corresponding network administrator of the compromised host.

In some embodiments, the system (e.g., a security entity, such as an inline firewall or client running on a client system) handles network traffic based on a determination of whether the network traffic comprises embedded DNS tunneling exploits. The handling the network traffic (e.g., the non-DNS network traffic) comprises: (i) intercepting the network traffic (e.g., including requests and responses from network traffic); (ii) optionally, decrypting the web traffic, if applicable (e.g., if the network traffic is encrypted; (iii) extracting hostnames from the network traffic; (iv) querying a security service (e.g., a cloud security platform) for a classification of whether the network traffic is malicious (e.g., a prediction of whether the hostname is malicious, etc.); (v) obtaining (e.g., from the security service) the classification (e.g., the verdict) of whether the network traffic is malicious; and (vi) performing an active measure with respect to the network traffic based at least in part on the classification. In some embodiments, the security entity identifies the network traffic (e.g., detects that intercepted traffic is network traffic) based at least in part on an application identifier (AppID). The security entity can identify network traffic for publicly hosted web services (e.g., reputable web services or malicious web services) used by client systems within a particular network (e.g., corporate managed devices that access from within the network internal web services or externally hosted web services). In some embodiments, the performing the active measure comprises handling the traffic, such as based at least in part on the classification and one or more predefined security policies. The active measure can include one or more of: blocking the network traffic, dropping the network traffic, quarantining network traffic from the compromised host, blocking network access to the compromised host (e.g., until an administrator actively requests the access be restored), notifying a user of the compromised host, notifying an administrator of the detected compromised host, etc. Various other active measures may be implemented.

According to various embodiments, the system (e.g., a security service or cloud security platform) detects DNS tunnelling traffic. The detecting of the DNS tunneling traffic comprises: (i) receiving from another system or service (e.g., a security entity such as an inline firewall) a query for a classification of a hostname; (ii) using (e.g., querying) a classifier (e.g., a machine learning model, etc.) for a classification of the hostname; (iii) obtaining the classification from the classifier; and (iv) providing an indication of the classification, such as to the system or service from which the query was received (e.g., sending the indication to the security entity that queried the security service for the classification). The classifier may be a DNS tunneling detector that is trained to detect DNS tunneling traffic.

As an illustrative example of the vulnerability that can be mitigated based on various embodiments described herein, web traffic to trusted web service was configured with dummy hostnames to determine whether trusted web services could be exploited to resolve the dummy hostnames embedded in web traffic fields. Simulations revealed that 6.5% of the top one million domains could be exploited to resolve dummy hostnames (e.g., a proxy for a malicious hostname used by a malicious attacker) embedded in HTTP headers, and 4.0% of the top one million domains could be exploited to resolve dummy hostnames embedded in HTTPS headers. Similarly, simulations revealed that 1.5% of the top one million domains could be exploited using dummy hostnames embedded in the TLS SNI.

FIG. 1 is a block diagram of an environment for providing a security service to a network according to various embodiments. In various embodiments, system 100 is implemented in connection with one or more of systems 500 of FIG. 5, or one or more of processes 700-1200 of FIGS. 7-12.

In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy, a network traffic handling policy, etc.) regarding communications between client devices, such as client devices 104 and 106, and nodes outside of enterprise network 110 (e.g., reachable via external network 118). Examples of such policies include policies governing traffic shaping, quality of service, and routing of traffic. Other examples of policies include security policies such as ones requiring the scanning for threats in incoming (and/or outgoing) email attachments, website content, inputs to application portals (e.g., web interfaces), files exchanged through instant messaging programs, and/or other file transfers. Other examples of policies include security policies (or other traffic monitoring policies) that selectively block traffic, such as traffic to malicious domains, DNS hijacked domains, or stockpiled domains, or such as traffic for certain applications (e.g., SaaS applications). In some embodiments, data appliance 102 is also configured to enforce policies with respect to traffic that stays within (or from coming into) enterprise network 110.

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, Microsoft Windows PE installers, etc.). In the example environment shown in FIG. 1, client devices 104-108 are a laptop computer, a desktop computer, and a tablet (respectively) present in an enterprise network 110. Client device 120 is a laptop computer present outside of enterprise network 110.

Data appliance 102 can be configured to work in cooperation with remote security platform 140. Security platform 140 can provide a variety of services, including classifying domains (e.g., predicting whether a domain is a malicious domain, etc.), detecting DNS tunneling traffic, detecting malicious traffic, classifying network traffic, providing a mapping of signatures to certain domains or DNS records (e.g., a DNS record for which a predicted likelihood that the record is a DNS hijacked record exceeds a predefined likelihood threshold, etc.), performing static and dynamic analysis on malware samples, monitoring new domains and new DNS records (e.g., detecting new domains for which a certificate is issued/generated), assessing maliciousness of domains, providing a list of signatures of known exploits (e.g., malicious input strings, malicious files, malicious domains, etc.) to data appliances, such as to data appliance 102 as part of a subscription, detecting exploits such as malicious input strings, malicious files, malicious domains (e.g., an on-demand detection, or periodical-based updates to a mapping of domains or DNS records to indications of whether the domains or DNS records are malicious or benign), providing a likelihood that a domain is malicious or benign, providing/updating a whitelist of input strings, files, or domains deemed to be benign, providing/updating input strings, files, or domains deemed to be malicious, identifying malicious input strings, detecting malicious input strings, detecting malicious files, predicting whether input strings, files, or domains are malicious, providing an indication that an input string, file, DNS record, or domain is malicious (or benign). In some embodiments, services provided by security platform 140 additionally comprise simulating DNS tunneling attacks/campaigns or relayed DNS tunneling attacks/campaigns, and/or training classifiers (e.g., training machine learning models), such as to be used to provide detection of malicious domains or detection of relayed DNS tunneling attacks.

In some embodiments, security platform 140 classifies the domains in response to receiving a network traffic sample or according to a predefined schedule. In connection with detecting malicious domains or web traffic, or detecting relayed DNS tunneling attacks, security platform 140 can obtain the information pertaining to the domains (e.g., pDNS data, geolocation data, etc.) and classify the domains based at least in part on querying a machine learning model. Security platform 140 may process the collected domains (e.g., domains or hostnames provided by a security entity in connection with a query for a verdict of whether the domain/hostname is malicious) and corresponding data pertaining to the domains (e.g., the pDNS data, the geolocation data, etc.) in batches such as according to a predefined frequency (e.g., daily, weekly, etc.). In some embodiments, security platform determines the predicted classification for a sample domain (e.g., predicts whether the domain is malicious) in real-time and provides the classification (e.g., a verdict) to an inline security entity for handling of the associated web traffic in real-time.

In various embodiments, results of analysis (and additional information pertaining to applications, domains, etc.), such as an analysis or classification performed by security platform 140, are stored in database 160. In various embodiments, security platform 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As one example, security platform 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 140 but may also be provided by a third party. As one example, the virtual machine server can rely on EC2, with the remaining portions of security platform 140 provided by dedicated hardware owned by and under the control of the operator of security platform 140.

In some embodiments, sample classifier 170 detects/classifies a domain. For example, sample classifier 170 predicts whether a particular web traffic corresponds to a relayed DNS tunneling attack based on classifying whether the domain (e.g., the hostname) extracted from the web traffic is malicious. Sample classifier 170 may receive a web traffic sample for classification or receive a sample domain that an inline security entity had extracted from an intercepted web traffic sample.

According to various embodiments, the domain is extracted (e.g., by security platform 140 or an inline security entity that queries security platform 140 for a classification) from a web traffic sample based at least in part on the web traffic type. For example, in response to obtaining the web traffic sample (e.g., a sample of non-DNS network traffic), the system (e.g., security platform 140 or an inline security entity) determines the web traffic type, and extracts the domain(s) from the web traffic sample based on the web traffic type. Examples of web traffic types include HTTP(S) traffic, SMTP traffic, TLS traffic, QUIC traffic, etc. According to various embodiments, web traffic is different from DNS traffic. For example, in some implementations web traffic is not a DNS request/query or a DNS response. Based at least in part on the web traffic type, the system determines the fields from which to extract the domain(s) from the header information associated with the web traffic type.

In some embodiments, security platform (e.g., sample classifier 170) determines a classification (e.g., a domain classification or a web traffic classification) for the web traffic or domain comprised in the web traffic (e.g., the domain obtained from the extracted header information). Sample classifier 170 can determine the classification based at least in part on querying a classifier. The classifier that is queried to provide a classification of the domain or web traffic associated with the domain is a fingerprinting-based classifier, a heuristics-based classifier, another rule-based classifier, and/or a machine-learning based classifier. The classifier may be trained based at least in part on historical samples (e.g., samples of domains extracted from web traffic). The classifier can be trained based at least in part on a machine learning process. Examples of machine learning processes that can be implemented in connection with training the classifier(s) include random forest, linear regression, support vector machine, naive Bayes, logistic regression, K-nearest neighbors (KNN), decision trees, gradient boosted decision trees, K-means clustering, hierarchical clustering, density-based spatial clustering of applications with noise (DBSCAN) clustering, principal component analysis, a neural network (NN), etc.

In some embodiments, the system determines the classification for the domain based at least in part on domain information. Examples of domain information include a certificate information pertaining to a certificate(s) associated with the candidate domain (e.g., the domain associated with the particular DNS request), registration information, pDNS data, geolocation data, scan data, active DNS information, zone file information, WHOIS registry data, web crawled data (e.g., data obtained by crawling the website), etc. Various combinations of data information may be used in connection with predicting the classification.

In some embodiments, sample classifier 170 determines a domain classification for a sample domain extracted from web traffic based at least in part on a machine learning-based classification. As an example, sample classifier 170 uses a machine learning-based classifier to determine a prediction of whether the sample domain is a malicious domain. Additionally, or alternatively, sample classifier 170 may implement one or more of a fingerprinting-based classification, a heuristics-based classification, or other rule-based classification to classify the sample domain.

According to various embodiments, sample classifier 170 performs a post-filtering with respect to the predictions generated by the machine learning-based classifier. The post-filtering can be performed using a fingerprinting-based classifier, a heuristics-based classifier, and/or other rule-based classifier to filter out potential false positives generated by the machine learning-based classifier (e.g., to remove predicted candidate DNS records that are likely not DNS hijacked domains).

System 100 (e.g., sample classifier 170, security platform 140, etc.) performs feature extraction with respect to the candidate record from domain information (e.g., pDNS data, geolocation data, certificates, registrant information, scan data, certificate data, WHOIS data, web crawled data, etc.). In some embodiments, system 100 (e.g., sample classifier 170) generates a set of features for training a machine learning model for classifying the domain (e.g., classifying whether the domain is malicious or non-malicious, predicting a likelihood that the domain is malicious, etc.). System 100 then uses the set of features to train a machine learning model (e.g., a random forest model) such as based on training data that includes samples of non-malicious domains and samples of malicious domains. In some embodiments, at least a subset of the features are pre-computed so sample classifier 170 can use the features to perform a real-time domain classification.

According to various embodiments, security platform 140 comprises DNS tunneling detector 138 and/or sample classifier 170. Security platform 140 may include various other services/modules, such as a malicious file detector, a malicious traffic detector, a parked domain detector, a DNS hijacked domain or DNS record detector, an application classifier or other traffic classifier, etc. Sample classifier 170 is used in connection with analyzing samples of domains and/or automatically detecting relayed DNS tunneling traffic.

In some embodiments, sample classifier 170 comprises one or more of hostname obtaining module 172, feature extraction module 174, prediction engine 176, and machine learning (ML) model 178.

Hostname obtaining module 172 is implemented to obtain a hostname or domain to be classified, such as a domain based on which security platform 140 determines whether the domain or web traffic corresponds to a malicious domain or web traffic (e.g., relayed DNS tunneling web traffic). In some embodiments, hostname obtaining module 172 obtains the domain from a security entity, such as a security entity that intercepted the corresponding web traffic and queried security platform 140 for the classification. In some embodiments, hostname obtaining module 172 extracts the domain from header information in a web traffic sample, such as a web traffic sample (e.g., a sample of non-DNS network traffic) provided by a security entity that obtained the web traffic sample while intercepting network traffic. The domain can be obtained from one or more fields in the header information. The one or more fields from which the domain is extracted can be determined based on a type of web traffic (e.g., HTTP(s), SMTP, TLS, QUIC, etc.).

Feature extraction module 174 is used to extract information associated with the domain. For example, feature extraction module 174 obtains domain information and extracts one or more features for the domain based at least in part on the domain information.

Sample classifier 170 uses prediction engine 176 to predict a classification for the domain or web traffic. For example, prediction engine 176 predicts whether a domain is malicious or whether a web traffic sample corresponds to a relayed DNS tunneling attack. Prediction engine 176 can obtain the predicted classification based at least in part on querying a classifier. The classifier that is queried to provide a classification of the domain or web traffic associated with the domain is a fingerprinting-based classifier, a heuristics-based classifier, another rule-based classifier, and/or a machine-learning based classifier (e.g., ML model 178).

In some embodiments, prediction engine 176 receives, from a classifier (e.g., the machine learning model), an indication of a likelihood that the domain corresponds to a malicious domain, a likelihood that the candidate domain is benign/non-malicious domain, or a likelihood that a web traffic sample is a relayed DNS tunneling attack, etc. In response to receiving the indication/prediction of the likelihood that the domain is malicious, etc., prediction engine 176 determines (e.g., predicts) a classification (e.g., a domain classification) based on such likelihood. For example, prediction engine 176 compares the likelihood that the domain corresponds to a malicious domain to a likelihood threshold value. In response to a determination that the likelihood that the domain corresponds to a malicious domain is greater than the likelihood threshold value, prediction engine 176 may deem (e.g., determine that) the domain corresponds to a malicious domain.

According to various embodiments, in response to sample classifier 170 classifying the domain, system 100 handles the corresponding web traffic according to a predefined policy (e.g., a security policy). For example, in response to predicting that the domain is a malicious domain, system 100 can cause the web traffic to be blocked or quarantined, etc. As another example, system 100 can cause traffic to/from a compromised host (e.g., the client system associated with the intercepted web traffic from which the malicious domain was extracted) to be quarantined or sinkholed, etc. (e.g., at least until an administrator actively configures system 100 to proceed with permitting traffic to/from the client system, such as in response to the compromised host being remediated).

According to various embodiments, in response to prediction engine 176 classifying the domain or web traffic, system 100 handles the web traffic according to a predefined policy (e.g., a security policy). For example, the system queries a traffic handling policy to determine the manner by which the web traffic with header information (e.g., a particular header field) comprising a domain matching the sample domain (e.g., the domain classified by prediction engine 176) is to be handled. The traffic handling policy may be a predefined policy, such as a security policy, etc. The traffic handling policy may indicate that traffic associated with certain domains is to be blocked and traffic associated with other domains is to be permitted to pass through the system (e.g., routed normally). The traffic handling policy may correspond to a repository of a set of policies to be enforced with respect to network traffic. In some embodiments, security platform 140 receives one or more policies, such as from an administrator or third-party service, and provides the one or more policies to various network nodes, such as endpoints, security entities (e.g., inline firewalls), etc.

In response to determining a classification for a newly analyzed domain, security platform 140 (e.g., sample classifier 170) sends an indication that records matching the domain are associated with, or otherwise correspond to, the determined classification. In the case that the determined classification for the domain is that the domain is a malicious domain, security platform 140 provides an indication that web traffic having header information comprising a domain matching the candidate domain (e.g., in one or more predefined header fields) is also to be handled according to whether the domain is malicious. Security platform 140 can provide an indication that web traffic with header information having a particular field comprising a domain corresponding to the domain predicted to be malicious is to be handled as a malicious web traffic (e.g., relayed DNS tunneling traffic). For example, security platform 140 determines (e.g., computes) a signature or identifier for the domain (e.g., a hash or other signature), and sends to a network node (e.g., a security entity, an endpoint such as a client device, etc.) an indication of the classification associated with the signature (e.g., an indication whether the domain is a malicious/non-malicious domain). Security platform 140 may update a mapping of signatures to domain classifications and provide the updated mapping to the security entity. In some embodiments, security platform 140 further provides to the network node (e.g., security entity, client device, etc.) an indication of a manner by which web traffic with header information that is comprised in a particular field a domain matching the signature is to be handled. For example, security platform 140 provides to the security entity a traffic handling policy, a security policy, or an update to a policy.

In some embodiments, system 100 (e.g., sample classifier 170 of security platform 140, or other security entity, etc.) determines whether information pertaining to a particular domain (e.g., a newly received domain to be analyzed) is comprised in a dataset of historical domains (e.g., historical network traffic, previously classified domains), whether a particular signature is associated with malicious traffic, or whether traffic corresponding to the candidate record to be otherwise handled in a manner different than the normal traffic handling. The historical information may be provided by another system or module, such as a service running on security platform 140, or by a third-party service such as VirusTotal™, or both. In response to determining that information pertaining to the domain is not comprised in, or available in, the dataset of historical domains (e.g., historical or previously analyzed domains), system 100 (e.g., sample classifier 170 or other security entity) may deem that the domain/traffic has not yet been analyzed and system 100 can invoke an analysis (e.g., a domain analysis) of the domain in connection with determining (e.g., predicting) the domain classification. The historical information (e.g., from a third-party service, a community-based score, etc.) indicates whether other vendors or cyber security organizations deem the particular traffic as malicious or should be handled in a certain manner.

Returning to FIG. 1, suppose that a malicious individual (using client device 120) has created malware or malicious sample 130, such as a file, an input string, etc. The malicious individual hopes that a client device, such as client device 104, will execute a copy of malware or other exploit (e.g., malware or malicious sample 130), compromising the client device, and causing the client device to become a bot in a botnet. The compromised client device can then be instructed to perform tasks (e.g., cryptocurrency mining, or participating in denial-of-service attacks) and/or to report information to an external entity (e.g., associated with such tasks, exfiltrate sensitive corporate data, etc.), such as C2 server 150, as well as to receive instructions from C2 server 150, as applicable.

DNS hijacked domains, for example, can be domains that are scams, phishing sites, or sites used to distribute C2 exploits or malware.

As an illustrative example, the environment shown in FIG. 1 includes three Domain Name System (DNS) servers (122-126). As shown, DNS server 122 is under the control of ACME (for use by computing assets located within enterprise network 110), while DNS server 124 is publicly accessible (and can also be used by computing assets located within network 110 as well as other devices, such as those located within other networks (e.g., networks 114 and 116)). DNS server 126 is publicly accessible but under the control of the malicious operator of C2 server 150. Enterprise DNS server 122 is configured to resolve enterprise domain names into IP addresses, and is further configured to communicate with one or more external DNS servers (e.g., DNS servers 124 and 126) to resolve domain names as applicable.

As mentioned above, in order to connect to a legitimate domain (e.g., www. example. com depicted as website 128), a client device, such as client device 104 will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C2 server 150, client device 104 will need to resolve the domain, "kj32hkjqfeuo32ylhkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C2 server 150 to receive data from client device 104.

Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, information input to a web interface such as a login screen, files exchanged through instant messaging programs, and/or other file transfers, and/or quarantining or deleting files or other exploits identified as being malicious (or likely malicious). In some embodiments, data appliance 102 is also configured to enforce policies with respect to traffic that stays within enterprise network 110. In some embodiments, a security policy includes an indication that network traffic (e.g., all network traffic, a particular type of network traffic, etc.) is to be classified/scanned by a classifier that implements a pre-filter model, such as in connection with detecting malicious or suspicious domains, detecting parked domains, or otherwise determining that certain detected network traffic is to be further analyzed (e.g., using a finer detection model).

In some embodiments, security platform 140 comprises a network traffic classifier that provides to a security entity, such as data appliance 102, an indication of the traffic classification. For example, in response to detecting the C2 traffic, network traffic classifier sends an indication that the domain traffic corresponds to C2 traffic to data appliance 102, and the data appliance 102 may in turn enforce one or more policies (e.g., security policies) based at least in part on the indication. The one or more security policies may include isolating/quarantining the content (e.g., webpage content) for the domain, blocking access to the domain (e.g., blocking traffic for the domain), isolating/deleting the domain access request for the domain, ensuring that the domain is not resolved, alerting or prompting the user of the client device the maliciousness of the domain prior to the user viewing the webpage, blocking traffic to or from a particular node (e.g., a compromised device, such as a device that serves as a beacon in C2 communications), etc. As another example, in response to determining the application for the domain, the network traffic classifier provides to the security entity with an update of a mapping of signatures to applications (e.g., application identifiers).

FIG. 2A is a block diagram of a system subject to a Domain Name System (DNS) tunneling attack. System 200 is configured to handle network traffic to/from client system 205. In the example shown, system 200 is subject to a DNS tunneling attack from client system 205. System 200 comprises firewall 215 to mediate ingress and egress network traffic (e.g., web traffic) to client system 205 (e.g., network traffic for the network to which client system 205 belongs). In connection with mediating the network traffic, firewall 215 can enforce one or more security policies to determine the manner for handling certain network traffic. Typically, predefined security policies for networks have permissive security policies for DNS traffic, and traffic from trusted DNS resolvers. Accordingly, DNS tunneling traffic abuses the relative permissive security policies of enterprises for DNS traffic and/or uses trusted DNS resolver as a proxy to route tunneling requests and responses toward attacker-controlled nameservers, which is a C2 server.

In the example shown, client system 205 is a compromised host and at 241 client 205 sends to DNS resolver 220 DNS traffic that comprises a malicious sample DNS query for the domain "$secret.badside.com". Firewall 215 intercepts this DNS traffic, however, because of the permissive security policies for DNS traffic, firewall 215 may permit the traffic to be sent to DNS resolver 220. In response to receiving the DNS query (which is malicious unbeknownst to DNS resolver 220), DNS resolver queries a series of DNS servers (e.g., in a specific order) until it finds the necessary IP address. For example, at 243, DNS resolver 220 queries root nameserver 225, such as in connection with translating the human-readable domains. Next, at 244, DNS resolver 220 queries TLD nameserver 230 for data pertaining to the top level domain for the domain comprised in the DNS query. TLD nameserver 230 provides an indication of the authoritative nameserver from which DNS resolver 220 can obtain the IP address for the domain comprised in the DNS query. At 245, DNS resolver 220 queries domain nameserver 235 (e.g., the authoritative server) for the IP address for the domain in comprised in the DNS query. The embedding of the malicious information in the DNS traffic, the attackers can exfiltrate data in the DNS query by causing DNS resolver 220 to communicate with a nameserver controlled by the attackers. Additionally, or alternatively, the attackers can infiltrate data to the network (e.g., to client system 205) by embedding malicious information in the DNS response provided to DNS resolver 220 by the nameserver controlled by the attackers.

Alternatively, an enterprise network may comprise a DNS resolver that is internal to the network. Attackers can use a similar mechanism to perform DNS tunneling traffic. For example, attackers cause client system 205 to send to internal resolver 210 a DNS query comprising malicious information (e.g., information to be exfiltrated, or a domain to reach a C2 server that provides a DNS response comprising malicious information to be infiltrated to the network). Similar to the process described above, the DNS tunneling attack abuses the permissive security policies for DNS traffic and the queries routed by internal nameserver 210 to the nameservers across firewall 215 are permitted to pass through firewall 215 without enforcement of robust security.

Although DNS tunneling can be an effective mechanism for exfiltrating or infiltrating an enterprise network, related art security systems can detect DNS tunneling traffic by inspecting statistical patterns of DNS requests and responses, and based on the detection of DNS tunneling traffic, the security systems can drop DNS traffic that is deemed to be DNS tunneling traffic (or have a profile that is similar to DNS tunneling traffic).

FIG. 2B is a block diagram of a system subject to a relayed DNS tunneling attack via HTTP(S) network traffic according to various embodiments. System 250 is configured to handle network traffic (e.g., web traffic) to/from client system 205. In the example shown, system 250 is subject to a relayed DNS tunneling attack from client system 205. System 200 comprises firewall 215 to mediate ingress and egress web traffic to client system 205 (e.g., network traffic for the network to which client system 205 belongs). In contrast to a DNS tunneling attack in which malicious information (e.g., a malicious domain) is comprised in a DNS query transmitted across a network (e.g., across firewall 215), a relayed DNS tunneling attack exploits relatively permissive security policies with respect to trusted web services, such as reputable web services. The related DNS tunneling attack exploits the fact that reputable web services may automatically resolve the hostnames specified in the web requests and essentially act as a proxy to route DNS tunneling requests towards attacker-controlled nameservers. The automatic resolution of untrusted hostnames by reputable web services can be considered as a new kind of server-side request forgery vulnerability, because it allows attackers to abuse their reputation and the underlying infrastructure (e.g. load balancer, worker, resolver) to evade detection by security vendors.

Internal web services (e.g., internal web service 270) are special because they are usually hosted on internal IPs within the firewall (e.g., firewall 215) and their outbound traffic is likely encoded or whitelisted, thus bypassing web traffic inspection at firewall level. Attackers can abuse the lack of internal web traffic visibility to evade detection by security services. In addition to abusing reputable web services (e.g., reputable web service 285) and internal web services, the attackers can potentially abuse permissive security policies for hostnames specified in web traffic by setting up their own malicious web services to relay DNS tunneling traffic. Malicious web services exploit the lack of cross-protocol threat prevention capabilities Returning to the example of system 250 shown in FIG. 2B, client system 205 (e.g., a compromised host) embeds malicious information, such as malicious domains (e.g., that eventually will be resolved and cause traffic to/from the attacker-controlled nameserver), into trusted web traffic. As 252, client system 205 embeds the malicious information into web traffic communicated to an internal web service 270. Firewall 215 enforces a security policy with respect to traffic egressing from internal web service 270, however, the security policy is permissive with such traffic from internal web service 270. Therefore, internal web service 270 sends the web traffic with embedded malicious information to a cloud worker 275 that is configured to provide a service/compute for internal web service 270. In response to receiving the web traffic, cloud worker 290 extracts the malicious information from the web traffic and causes resolve the domain comprised in the malicious information to be resolved. Thereafter a similar mechanism is employed to carry out the DNS tunneling. At 254, cloud worker 275 sends a DNS query to DNS resolver 220 to resolve the domain (e.g., the malicious domain) extracted from the web traffic. In response to receiving the DNS query, at 256, 258, and 260, DNS resolver 220 respectively queries root nameserver 225, TLD nameserver 230, and domain nameserver 235 to resolve the domain.

Alternatively, an attacker use reputable web services that are external to a network to carry out a relayed DNS tunneling attack. For example, at 262, client system 205 sends web traffic to reputable web service 285 web traffic in which malicious information (e.g., a malicious domain that will be resolved) is embedded. Because firewall 215 enforces a security policy that is permissive with respect to reputable web service 285, the web traffic (e.g., the malicious web traffic) passes through firewall 215 without detection. In response to receiving the web traffic (which is malicious unbeknownst to reputable web service 285), reputable web service 285 extracts the domain (e.g., the malicious domain) from the web traffic and communicates the domain to cloud worker 290 or a DNS resolver 220 which then communicates with a C2 server (e.g., an attacker-controlled nameserver).

Web traffic for which a relayed DNS tunneling attack can be carried out includes HTTP traffic, SMTP traffic (e.g., email traffic), TLS traffic, QUIC, etc.

Figure 3:
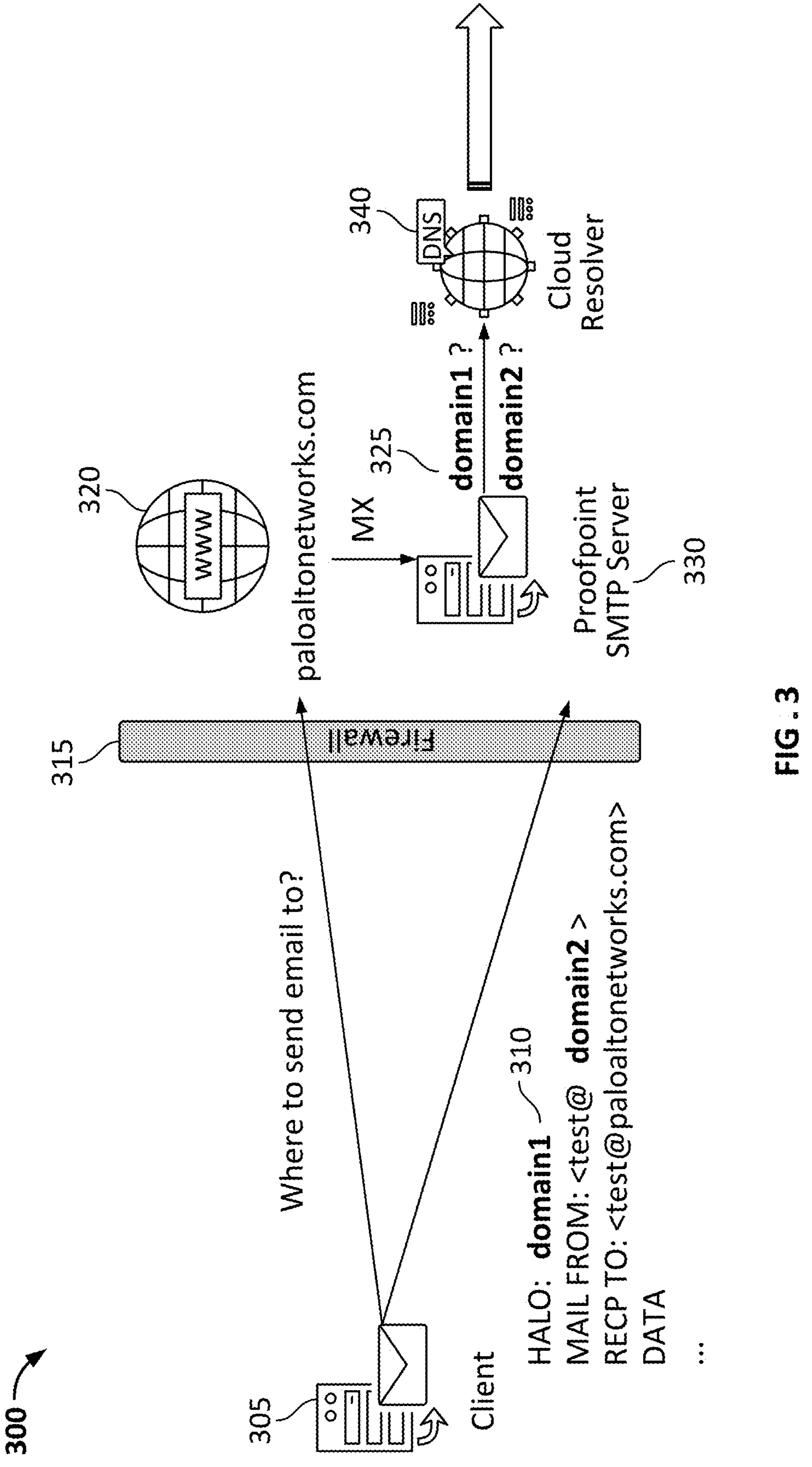
FIG. 3 is a block diagram of a system subject to a relayed DNS tunneling attack via SMTP network traffic according to various embodiments.

FIG. 3 is a block diagram of a system subject to a relayed DNS tunneling attack via SMTP network traffic according to various embodiments. In the example shown, system 300 is subject to a relayed DNS tunneling attack via SMTP traffic. In this type of attack, the attackers cause client system 305 to embed malicious information (e.g., malicious domains) into one or more headers in the SMTP traffic, such as SMTP traffic sample 310, to ensure the malicious information is communicated across firewall 315. Client system 305 sends the SMTP traffic to security service 320, which may forward the SMTP traffic to an SMTP server 330, or client system 305 may send the SMTP traffic directly to SMTP server 330. Firewall 315 enforces security policies with respect to traffic to/from client system 305, however, the security policies may be relatively permissive for SMTP traffic and firewall 315 may thus allow SMTP traffic. In response to receiving the SMTP traffic (e.g., SMTP traffic sample 310 comprising malicious information), SMTP server 330 extracts the malicious information from the SMTP traffic. For example, SMTP server 330 extracts the information from the “From” header in the SMTP traffic sample 310. In response to obtaining the domain in the “From” header, SMTP server 330 causes the domain to be resolved. Therefore, at 325, SMTP server 330 sends a DNS query to DNS resolver 340 for the domain (e.g., the malicious domain) extracted from the “From”header. DNS resolver 340 then causes the domain to be resolved.

Figure 4:
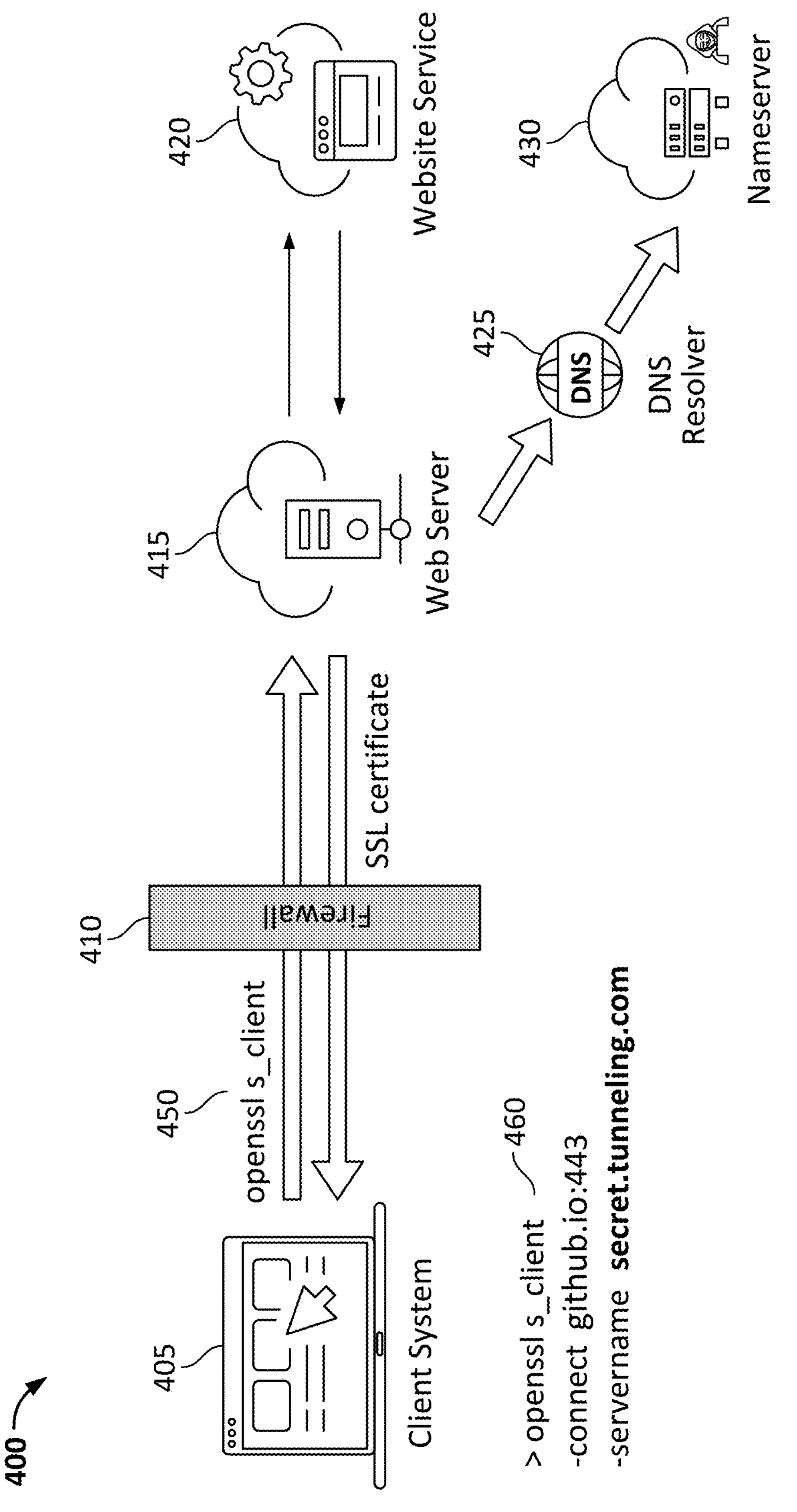
FIG. 4 is a block diagram of a system subject to a subject to a relayed DNS tunneling attack via TLS network traffic according to various embodiments.

FIG. 4 is a block diagram of a system subject to a subject to a relayed DNS tunneling attack via TLS network traffic according to various embodiments. In the example shown, system 400 is subject to a relayed DNS tunneling attack via TLS traffic. In this type of attack, the attackers cause client system 405 to embed malicious information (e.g., malicious domains) into one or more headers in the TLS traffic, such as TLS traffic sample 460, to ensure the malicious information is communicated across firewall 410. At 450, client system 405 sends the TLS traffic (e.g., TLS traffic sample 460) to web server 415 which is configured to obtain a service from website service 420. In response to receiving the TLS traffic, web server 415 can extract the domain from TLS traffic, which may include malicious information (e.g., the malicious domain) unbeknownst to web server 415. In response to obtaining the domain (e.g., the malicious domain), web server 415 sends a DSN query to DNS resolver 425 to resolve the domain extracted from the TLS traffic. Accordingly, if the domain extracted from the TLS traffic is malicious, the TLS traffic can be used to relay the DNS tunneling traffic. QUIC traffic is similar to TLS traffic by its use of SNI and certificate, and can thus be subject to the same manipulation attack.

Figure 5:
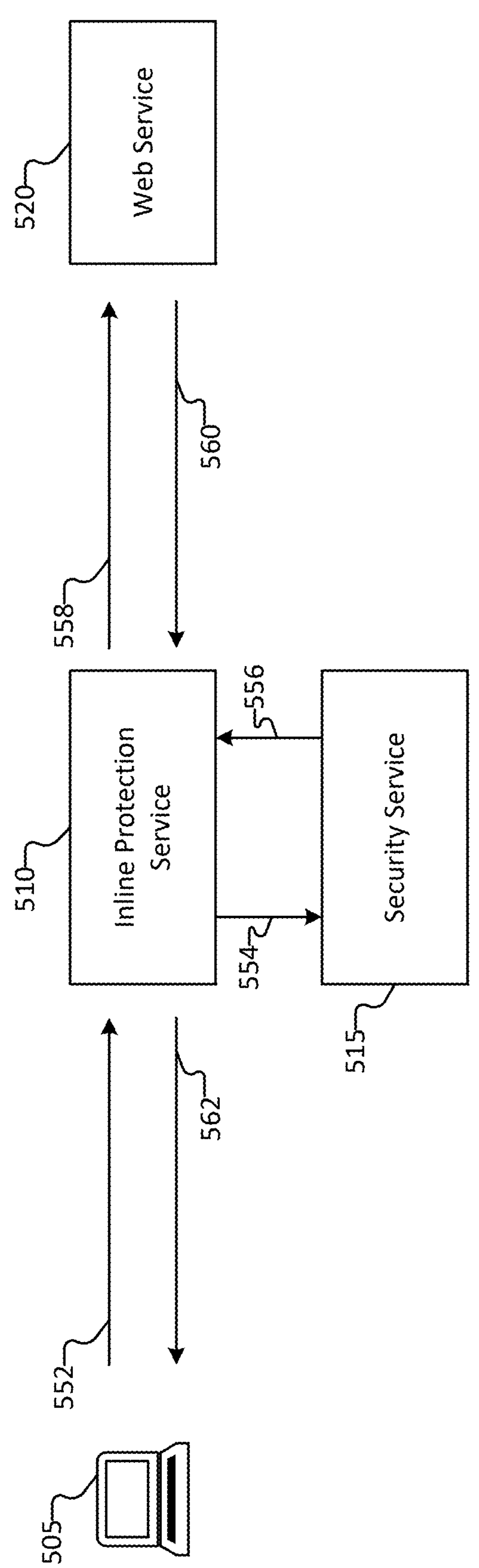
FIG. 5 is a block diagram of a system configured to detect malicious network traffic according to various embodiments.

FIG. 5 is a block diagram of a system configured to detect malicious network traffic according to various embodiments. In some embodiments, system 500 implements at least part of system 100 of FIG. 1. System 500 can implement one or more of processes 700-1200 of FIGS. 7-12.

System 500 is configured to provide a security service for a client system, such as client system 505, or a network with which the client system is associated (e.g., a security service customer's enterprise network). According to various embodiments, system 500 is configured to provide web traffic classifications and to detect relayed DNS tunneling attacks. System 500 extracts hostnames from non-DNS network traffic (e.g., web traffic) and causes the hostnames to be classified, such as to predict whether the non-DNS network traffic from which the hostname(s) is extracted is malicious traffic.

According to various embodiments, system 500 is configured to detect malicious network traffic, such as traffic corresponding relayed DNS tunneling attacks. In the example shown, system 500 comprises security service 515. System 500 may additionally comprise, or interface with, firewall 510, client system 505, and/or a web service 520.

System 500 comprises a detection pipeline that can detect malicious traffic, such as by classifying internet or application traffic, files transmitted across (e.g., to/from) the network, or DNS traffic. System 500 can use a security entity, such as firewall 510, to provide inline detection or otherwise to intercept traffic and query security service 515 to perform a real-time detection. For example, firewall 510 can intercept network traffic and perform an inline classification, such as by using a light weight classifier (e.g., a machine learning model) or by comparing an identifier for the traffic (e.g., a hash computed for the traffic such as a hash of the file, a hash of the header, etc.) to a whitelist or blacklist provided to the firewall 510 by security service 515. Firewall 510 can also provide a real-time detection by querying security service 515 to provide a classification for the network traffic (e.g., the file, internet or application traffic, or DNS traffic). In connection with providing the real-time detection, firewall 510 queries the security service 515 contemporaneous with the handing of the traffic being classified. For example, firewall 510 can query the security service 515 and receive a response (e.g., the classification) within 100 ms of firewall 510 intercepting the traffic.

The following description of system 500 is provided in the context of detecting relayed DNS tunneling traffic and system 500 providing security service with respect to web traffic. However, various other traffic or security services may be provided.

As an illustrative example, system 500 uses a security service 515 to perform detection of relayed DNS tunneling attacks based at least in part on intercepted web traffic (e.g., a hostname(s) extracted from web traffic). In some embodiments, the intercepted web traffic is non-DNS traffic (e.g., the hostname is embedded in a packet that is not a DNS query or a DNS response). Web traffic (e.g., non-DNS network traffic) is intercepted by an inline protection service, such as a service provided by a security entity. According to various embodiments, the security entity may be firewall 510, a client running on a protected device (e.g., client system 505), etc. In response to the inline protection service intercepting the web traffic, the inline protection service extracts a hostname comprised in the web traffic and queries security service 515 based on the extracted hostname(s). For example, the inline protection service (e.g., deployed by firewall 510 in the example shown) queries security service 515 for a classification of the traffic. In some embodiments, the classification of the traffic may include a verdict or prediction of whether the traffic is malicious or benign, or a verdict or prediction of whether the hostname extracted from the web traffic is malicious. In response to determining the classification of the traffic associated with the hostname extracted from the web traffic (e.g., determining the classification for the extracted hostname), security service 515 provides an indication to the inline protection service (e.g., firewall 510) that indicates whether the hostname is malicious (e.g., malicious or benign/non-malicious) or indicates whether the traffic associated with the hostname is malicious. For example, security service 515 returns the verdict or classification to the inline protection service. In some embodiments, in response to receiving the verdict or classification, the inline protection service performs an active measure with respect to the web traffic (e.g., the traffic from which the classified hostname was extracted). As an example, firewall 510 enforces one or more security policies with respect to the intercepted web traffic based at least in part on the classification. Examples of active measures may include blocking or sinkholing the traffic, alerting the user of client system 505 that its device is compromised, providing an alert to an administrator (e.g., a network administrator for the inline protection service) that indicates that the client system 505 is a compromised host, updating a blacklist of domains/hostnames, etc. Various other active measures may be implemented.

In some embodiments, the security entity (e.g., firewall 510) stores a whitelist and/or blacklist of domains/hostnames that can be queried by the security entity to provide inline detection of web traffic. In response to determining that a domain/hostname extracted from intercepted web traffic is not comprised in the whitelist or blacklist of domains, the security entity can query security service 515 for a predicted classification.

According to various embodiments, in response to intercepting the web traffic, the inline protection service (e.g., the service deployed by firewall 510) extracts a hostname, such as from a header in the web traffic. In some embodiments, the inline protection service determines a type of web traffic and in response to determining the type of web traffic extracts the hostname based on the type of web traffic. For example, the inline protection service uses the type of web traffic to determine one or more headers from which the hostname is to be extracted. Examples of types of web traffic for which a hostname can be extracted and classified include HTTP traffic, HTTPS traffic, SMTP traffic, TLS traffic, QUIC traffic, etc. Various other types of web traffic may be implemented.

According to various embodiments, in response to determining that the intercepted web traffic is HTTP(S) traffic, the inline protection service (e.g., firewall 510) extracts header information from the web traffic, and can obtain the hostname (e.g., a domain) from the header information. In some embodiments, the inline protection service extracts the hostname from the Host header. In various other embodiments, the inline protection service extracts a hostname(s) from one or more other fields, such as the User-Agent header, the Referer header, etc.

In response to determining that the web traffic is HTTP(S) traffic, the inline protection service can determine whether the header information extracted from the web traffic is to be decrypted. If inline protection service determines that the hostname extracted from the HTTP(S) traffic (e.g., from the Host header) is to be decrypted, the inline protection service (e.g., firewall 510) decrypts the hostname using an applicable standard protocol, such as SSL decryption.

According to various embodiments, in response to determining that the intercepted web traffic is SMTP traffic, the inline protection service (e.g., firewall 510) extracts header information from the web traffic, and can obtain the hostname (e.g., a domain) from the header information. In some embodiments, the inline protection service extracts the hostname from the From header. In various other embodiments, the inline protection service extracts a hostname(s) from one or more other fields, such as the To header, a customer header, a body of an email, a subject header, etc.

According to various embodiments, in response to determining that the intercepted web traffic is TLS traffic, the inline protection service (e.g., firewall 510) extracts header information from the web traffic, and can obtain the hostname (e.g., a domain) from the header information. In some embodiments, the inline protection service extracts the hostname from the Server Name Indication (SNI) field during the TLS handshake, which indicates the hostname to which the client is attempting to connect. Fields within the TLS certificate, such as the Common Name (CN) or Subject Alternative Name (SAN), can also be manipulated to include DNS queries. Additionally, the Application-Layer Protocol Negotiation (ALPN) extension, which allows the application layer to negotiate the protocol used over a secure connection, can be exploited to embed DNS queries. According to various embodiments, QUIC traffic can be handled in a similar manner as TLS traffic.

According to various embodiments, in response to receiving a request for verdict, such as a predicted classification, for a domain (e.g., a hostname) or a particular web traffic sample (e.g., a sample of non-DNS traffic), security service 515 can determine a predicted classification based at least in part on the hostname extracted from the web traffic. For example, inline protection service provides the domain/hostname to security service 515. In some embodiments, security service 515 queries a classifier for the predicted classification. Security service 515 provides the verdict or response to the inline protection service based on the predicted classification. As an example, the predicted classification may indicate a likelihood that the domain or associated web traffic is malicious. Security service 515 compares the likelihood to one or more thresholds to determine whether the domain or web traffic is malicious (e.g., is to be deemed malicious) or benign (e.g., is deemed to be non-malicious). The one or more thresholds used to classify a predicted classification can be configurable, such as by an administrator to adjust a sensitivity of the malicious domain detection (e.g., to adjust the sensitivity for detecting relayed DNS tunneling traffic).

In some embodiments, the classifier that is queried to provide a classification of the domain or web traffic associated with the domain is a fingerprinting-based classifier, a heuristics-based classifier, another rule-based classifier, and/or a machine-learning based classifier. The classifier may be trained based at least in part on historical samples (e.g., samples of domains extracted from web traffic). The classifier can be trained based at least in part on a machine learning process. Examples of machine learning processes that can be implemented in connection with training the classifier(s) include random forest, linear regression, support vector machine, naive Bayes, logistic regression, K-nearest neighbors (KNN), decision trees, gradient boosted decision trees, K-means clustering, hierarchical clustering, density-based spatial clustering of applications with noise (DBSCAN) clustering, principal component analysis, a neural network (NN), etc.

At 552, firewall 510 obtains web traffic (e.g., a web traffic sample) from a client system 205 (e.g., a customer's system, a managed device for a customer's network). Firewall 510 may intercept the web traffic during the handling or mediating traffic to/from the client system 505. In response to obtaining the web traffic, firewall 510 sends the web traffic to security service 515, such as in connection with querying security service 515 for an indication of whether the web traffic is malicious. In some embodiments, firewall 510 extracts a domain (e.g., a hostname) comprised in the web traffic (e.g., a domain obtained from header information extracted from one or more headers in the web traffic) and, at 554, queries security service 515 for the classification. Security service 515 can determine whether the domain is malicious or whether the web traffic corresponds to a relayed DNS tunneling attack, such as based on querying a classifier for a predicted classification or based on querying a whitelist or blacklist of previously classified domains. At 556, security service 515 provides the verdict (e.g., an indication of the classification for the domain or associated web traffic). If security service 515 determines that the domain is not malicious, at 556, security service 515 provides to firewall 510 an indication that the domain or web traffic is not malicious. Otherwise, if security service 515 determines that the domain is malicious, at 556, security service 515 provides to firewall 510 an indication that the domain or web traffic is malicious. In response to receiving an indication that the domain or associated web traffic is malicious, firewall 510 can correspondingly apply a security policy with respect to the associated web traffic. Enforcing the security policy can include blocking or quarantining the web traffic, prompting a user of the client system 505 to indicate that the client system 505 is compromised, providing an alert/indication to a network administrator that client system 505 is a compromised host, etc. Conversely, in response to receiving an indication that the domain or associated web traffic is not malicious (e.g., benign), at 558, firewall 510 sends (e.g., forwards) the web traffic to web service 520, which can include resolving the extracted domain in connection with processing the web traffic. At 560, firewall 510 obtains the response from web service 520. At 562, firewall 510 provides the response to client system 505.

FIG. 6A is an example of a relayed DNS tunneling attack referred to as Decoy Dog that uses a fully qualified domain name (FQDN) embedded in the Host header of network traffic. In the example shown, sample 610 shows a Decoy Dog DNS tunneling attack that tunnels an FQDN in the Host header of HTTP traffic. Sample 610 was observed in the wild and was sent to a financial company network and a family service.

FIG. 6B is an example of a relayed DNS tunneling attack referred to as Burp Collaborator that uses an FQDN embedded in the Host header of network traffic. In the example shown, sample 620 shows a Burp Collaborator DNS tunneling attack that tunnels an FQDN in the Host header of HTTP traffic. Sample 620 was observed in the wild and was sent to various government-related websites.

FIG. 6C is an example of a relayed DNS tunneling attack referred to as Interactsh that uses an FQDN embedded in Host or VCIP headers. In the example shown, sample 630 shows a Interactsh DNS tunneling attack that tunnels an FQDN in the Host and VCIP headers of HTTP traffic. Sample 630 was observed in the wild and was used to attack a corporate network.

Figure 7:
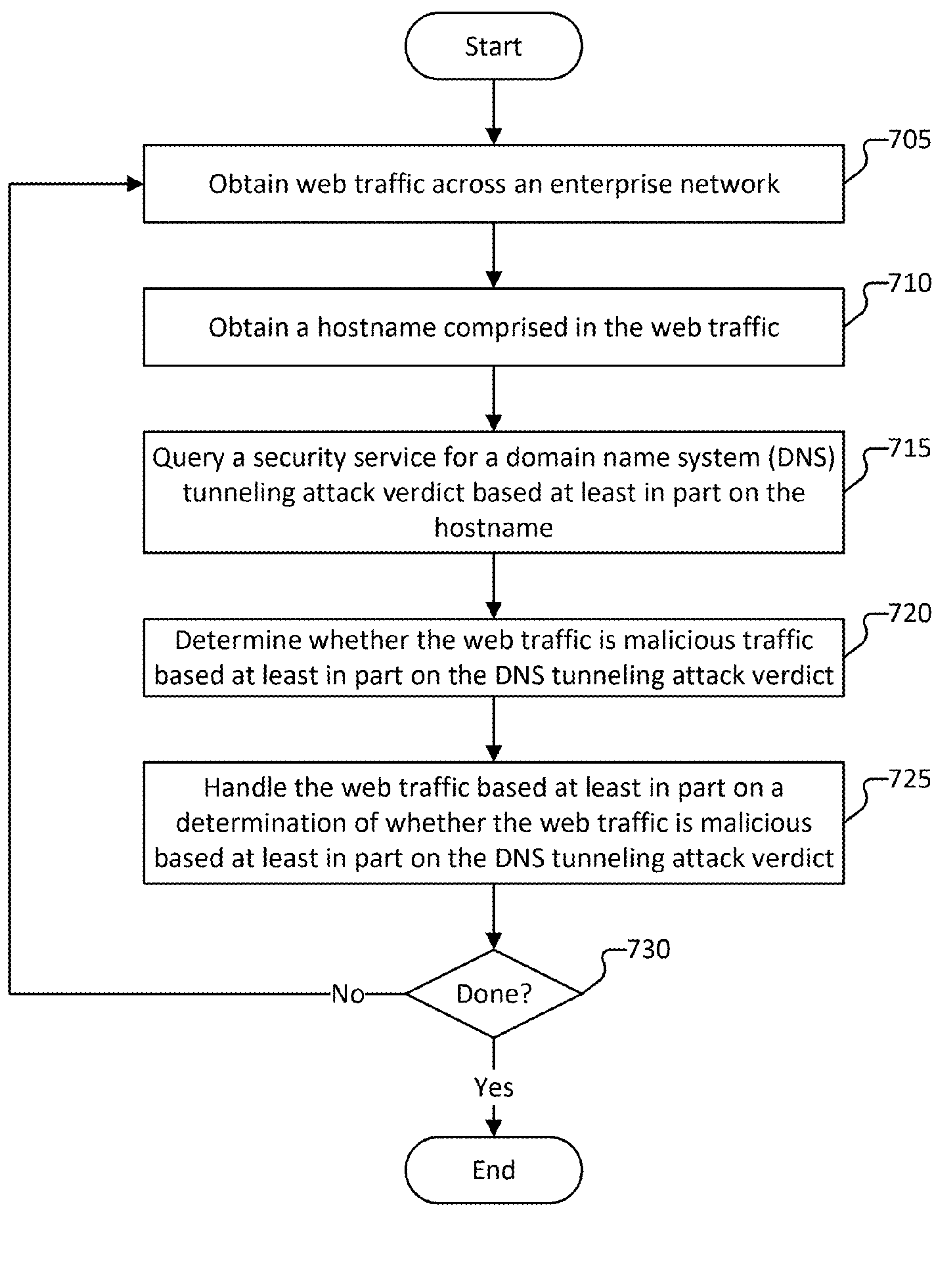
FIG. 7 is a flow diagram of a method for handling network traffic based on a determination of whether the network traffic corresponds to a DNS tunneling attack according to various embodiments.

FIG. 7 is a flow diagram of a method for handling network traffic based on a determination of whether the network traffic corresponds to a DNS tunneling attack according to various embodiments. In some embodiments, process 700 is implemented at least in part by system 100 of FIG. 1 and/or system 500 of FIG. 5. Process 700 may be implemented by a system (e.g., a cloud security platform) providing security service to an inline security entity, such as to a firewall (e.g., a next generation firewall). In some embodiments, process 700 is implemented by an inline security entity.

At 705, the system obtains network traffic (e.g., a non-DNS network traffic, such as web traffic) across an enterprise network. In some embodiments, the system obtains the network traffic (e.g., the web traffic) by intercepting the network traffic, such as when the traffic ingresses or egresses from the enterprise network. For example, a security entity, such as a firewall, can intercept network traffic (e.g., the non-DNS network traffic) travelling across or into or out of the enterprise network. In some embodiments, the system obtains the network traffic by intercepting the network traffic based on a client running on the particular device sending or receiving the network traffic. For example, a mobile device may have a client running to provide security services for the device vis a vis an enterprise network, such as to configure the mobile device as a managed device for the enterprise network. At 710, the system obtains a hostname comprised in the network traffic (e.g., the non-DNS network traffic). In some embodiments, the system obtains the hostname based at least in part on invoking process 800. The system can extract one or more hostnames from one or more headers in the web traffic. At 715, the system queries a security service for a domain name system (DNS) tunneling attack verdict based at least in part on the hostname. For example, the system queries the security service for a hostname classification that indicates whether the hostname is associated with a DNS tunneling attack or whether the hostname is non-malicious (e.g., benign). At 720, the system determines whether the network traffic is malicious traffic based at least in part on the DNS tunneling attack verdict. For example, if the verdict returned by the security service (e.g., the predicted classification provided by the classifier) indicates that the network traffic corresponds to a DNS tunneling attack, then the system can deem the network traffic as malicious. At 725, the system handles the network traffic based at least in part on a determination of whether the network traffic is malicious based at least in part on the DNS tunneling attack verdict. In some embodiments, the system handles the network traffic based on one or more predefined security policies, and the system enforces the one or more security policies based at least in part on a determination of whether the network traffic is malicious (e.g., whether a classifier has predicted that the network traffic is malicious) or benign. At 730, a determination is made as to whether process 700 is complete. In some embodiments, process 700 is determined to be complete in response to a determination that no further network traffic is to be analyzed/evaluated, (e.g., no further traffic classification predictions are to be generated), an administrator indicates that process 700 is to be paused or stopped, etc. In response to a determination that process 700 is complete, process 700 ends. In response to a determination that process 700 is not complete, process 700 returns to 705.

Figure 8:
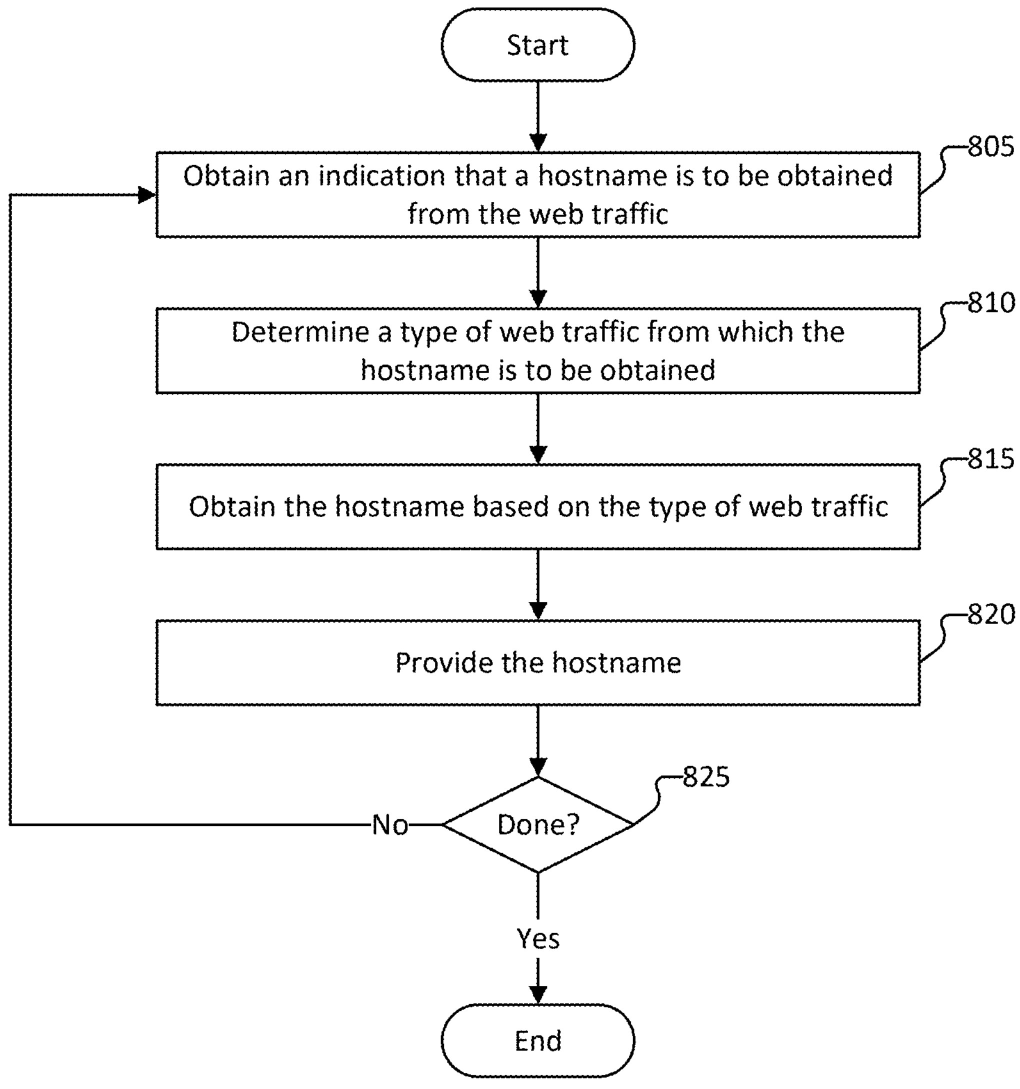
FIG. 8 is a flow diagram of a method for obtaining a hostname from the network traffic according to various embodiments.

FIG. 8 is a flow diagram of a method for obtaining a hostname from the network traffic according to various embodiments. In some embodiments, process 800 is implemented at least in part by system 100 of FIG. 1 and/or system 500 of FIG. 5. Process 800 may be implemented by a system (e.g., a cloud security platform) providing security service to an inline security entity, such as to a firewall (e.g., a next generation firewall). In some embodiments, process 800 is implemented by an inline security entity.

According to various embodiments, process 800 is invoked by process 700, such as at 710.

At 805, the system obtains an indication that a hostname is to be obtained from the web traffic (e.g., the non-DNS network traffic). At 810, the system determines a type of web traffic from which the hostname is to be obtained. In some embodiments, the system determines the type of web traffic based at least in part on an application identifier (AppID) associated with the network traffic. As an example, the system comprises, or has access to, a mappings of AppID to traffic type (or communication protocol). The system can query the mappings to determine the traffic type based at least in part on the AppID. The system can determine based at least in part on the AppID whether the web traffic is HTTP(S) traffic, email traffic (e.g., SMTP traffic), TLS traffic, QUIC traffic, etc. At 815, the system obtains the hostname based at least in part on the type of web traffic. For example, the system extracts the hostname(s) from one or more headers in the web traffic (e.g., a packet obtained from the web traffic). In some embodiments, the system obtains the hostname by invoking process 900, 1000, or 1100 based at least in part on the type of web traffic. At 820, the system provides the hostname. For example, the system provides the indication to the process, system, or service that invoked process 800. In some embodiments, the system is a service running on a security entity or client system (e.g., as client software running on a device to cause the device to be managed according to the enterprise network security policies). The system can provide the indication of the hostname (s) to another service running on the security entity or client system, such as the service that intercepts the network traffic (e.g., the web traffic) and classifies (or queries other services, such as a cloud security platform for a classification) the network traffic, or a service that coordinates the interception, classification, and handling of the network traffic. At 825, a determination is made as to whether process 800 is complete. In some embodiments, process 800 is determined to be complete in response to a determination that no further hostnames are to be extracted, no further network traffic is to be analyzed/evaluated, (e.g., no further traffic classification predictions are to be generated), an administrator indicates that process 800 is to be paused or stopped, etc. In response to a determination that process 800 is complete, process 800 ends. In response to a determination that process 800 is not complete, process 800 returns to 805.

Figure 9:
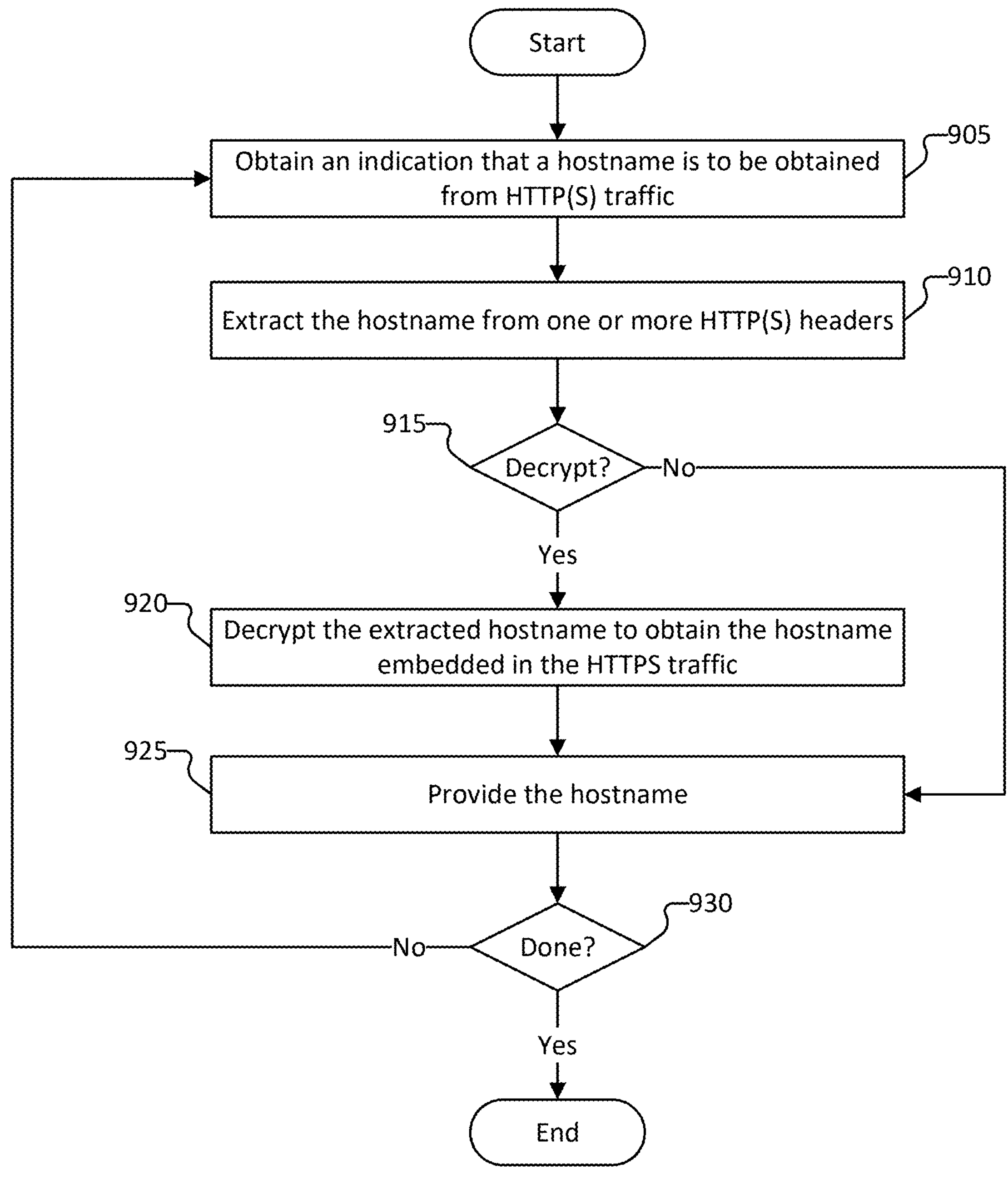
FIG. 9 is a flow diagram of a method for obtaining a hostname embedded in HTTP(S) network traffic according to various embodiments.

FIG. 9 is a flow diagram of a method for obtaining a hostname embedded in HTTP(S) network traffic according to various embodiments. In some embodiments, process 900 is implemented at least in part by system 100 of FIG. 1 and/or system 500 of FIG. 5. Process 900 may be implemented by a system (e.g., a cloud security platform) providing security service to an inline security entity, such as to a firewall (e.g., a next generation firewall). In some embodiments, process 900 is implemented by an inline security entity.

At 905, the system obtains an indication that a hostname is to be obtained from HTTP(s) traffic. For example, the process, system, or service that invoked process 900 determined that the traffic to be classified (e.g., the intercepted network traffic) and determined (e.g., identified) the traffic as HTTP(S) traffic. At 910, the system extracts the hostname(s) embedded in an HTTP(S) header field(s). As an example, the system extracts plane text headers in HTTP requests. As another example, the system extracts the encrypted headers in HTTPS requests. At 915, the system determines whether to decrypt the headers. For example, the system determines whether the web traffic is HTTP traffic or HTTPS traffic. In response to determining that the web traffic is HTTP traffic, the system determines that the extracted is not to be decrypted. In response to determining that the web traffic is HTTPS traffic, the system determines that the extracted header is to be decrypted. In response to determining that the extracted HTTP(S) header are to be decrypted, process 900 proceeds to 920 at which the system decrypts the extracted hostname to obtain the hostname embedded in the HTTPS traffic. Thereafter, process 900 proceeds to 925. Conversely, in response to determining that the extracted header is not to be decrypted, process 900 proceeds to 925. At 925, the system provides the hostname (e.g., the decrypted hostname in the case that the web traffic is HTTPS traffic). For example, the system provides the indication to the process, system, or service that invoked process 900. In some embodiments, the system is a service running on a security entity or client system (e.g., as client software running on a device to cause the device to be managed according to the enterprise network security policies). The system can provide the indication of the hostname(s) to another service running on the security entity or client system, such as the service that intercepts the network traffic and classifies (or queries other services, such as a cloud security platform for a classification) the network traffic, or a service that coordinates the interception, classification, and handling of the network traffic. At 930, a determination is made as to whether process 900 is complete. In some embodiments, process 900 is determined to be complete in response to a determination that no further hostnames are to be extracted, no further network traffic is to be analyzed/evaluated, (e.g., no further traffic classification predictions are to be generated), an administrator indicates that process 900 is to be paused or stopped, etc. In response to a determination that process 900 is complete, process 900 ends. In response to a determination that process 900 is not complete, process 900 returns to 905.

Figure 10:
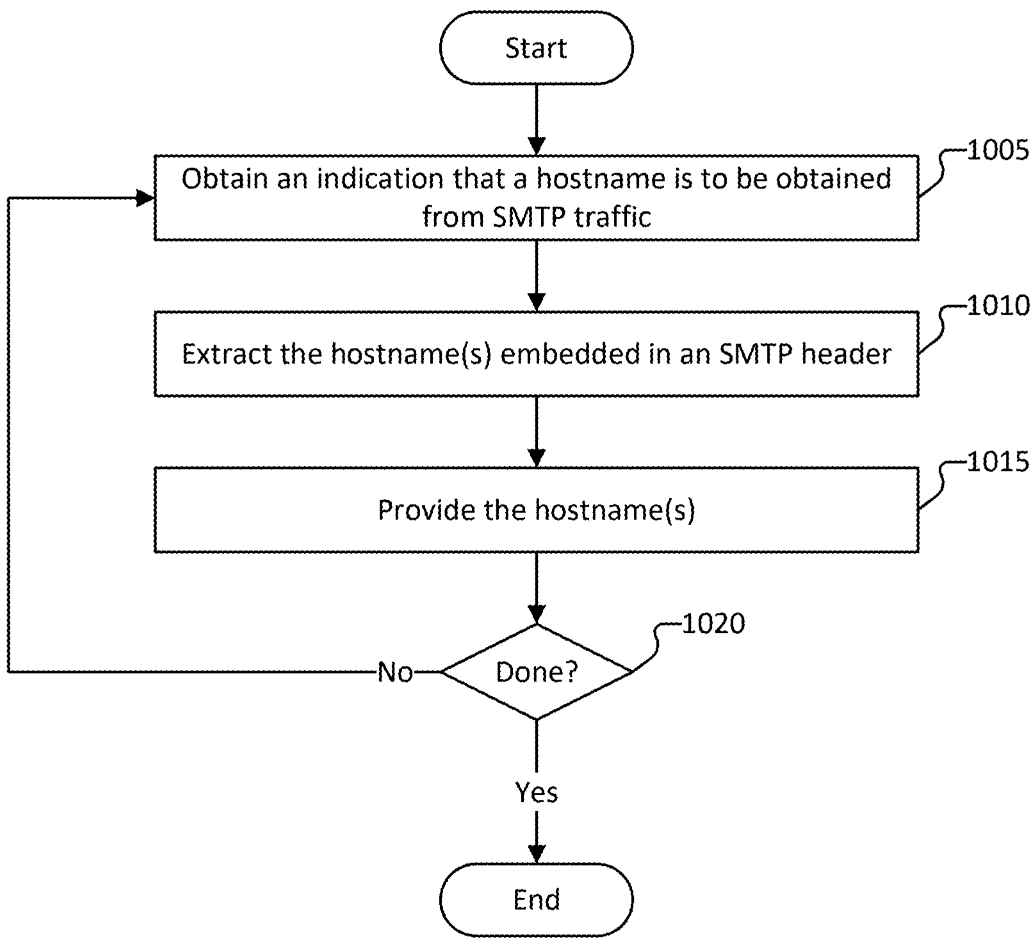
FIG. 10 is a flow diagram of a method for obtaining a hostname embedded in SMTP network traffic according to various embodiments.

FIG. 10 is a flow diagram of a method for obtaining a hostname embedded in SMTP network traffic according to various embodiments. In some embodiments, process 1000 is implemented at least in part by system 100 of FIG. 1 and/or system 500 of FIG. 5. Process 1000 may be implemented by a system (e.g., a cloud security platform) providing security service to an inline security entity, such as to a firewall (e.g., a next generation firewall). In some embodiments, process 1000 is implemented by an inline security entity.

At 1005, the system obtains an indication that a hostname is to be obtained from SMTP traffic. For example, the process, system, or service that invoked process 1000 determined that the traffic to be classified (e.g., the intercepted network traffic) and determined (e.g., identified) the traffic as SMTP traffic. At 1010, the system extracts the hostname(s) embedded in an SMTP header fields. In some embodiments, the system extracts the hostname(s) from the "To" field and/or "From" field in the SMTP traffic. Various other headers may be used to embed malicious hostnames. Accordingly, the system can additionally, or alternatively, extract the hostname(s) from other fields, such as the "Reply-To" and/or "Return-Path. At 1015, the system provides the hostname(s). For example, the system provides the indication to the process, system, or service that invoked process 1000. In some embodiments, the system is a service running on a security entity or client system (e.g., as client software running on a device to cause the device to be managed according to the enterprise network security policies). The system can provide the indication of the hostname (s) to another service running on the security entity or client system, such as the service that intercepts the network traffic and classifies (or queries other services, such as a cloud security platform for a classification) the network traffic, or a service that coordinates the interception, classification, and handling of the network traffic. At 1020, a determination is made as to whether process 1000 is complete. In some embodiments, process 1000 is determined to be complete in response to a determination that no further hostnames are to be extracted, no further network traffic is to be analyzed/ evaluated, (e.g., no further traffic classification predictions are to be generated), an administrator indicates that process 1000 is to be paused or stopped, etc. In response to a determination that process 1000 is complete, process 1000 ends. In response to a determination that process 1000 is not complete, process 1000 returns to 1005.

Figure 11:
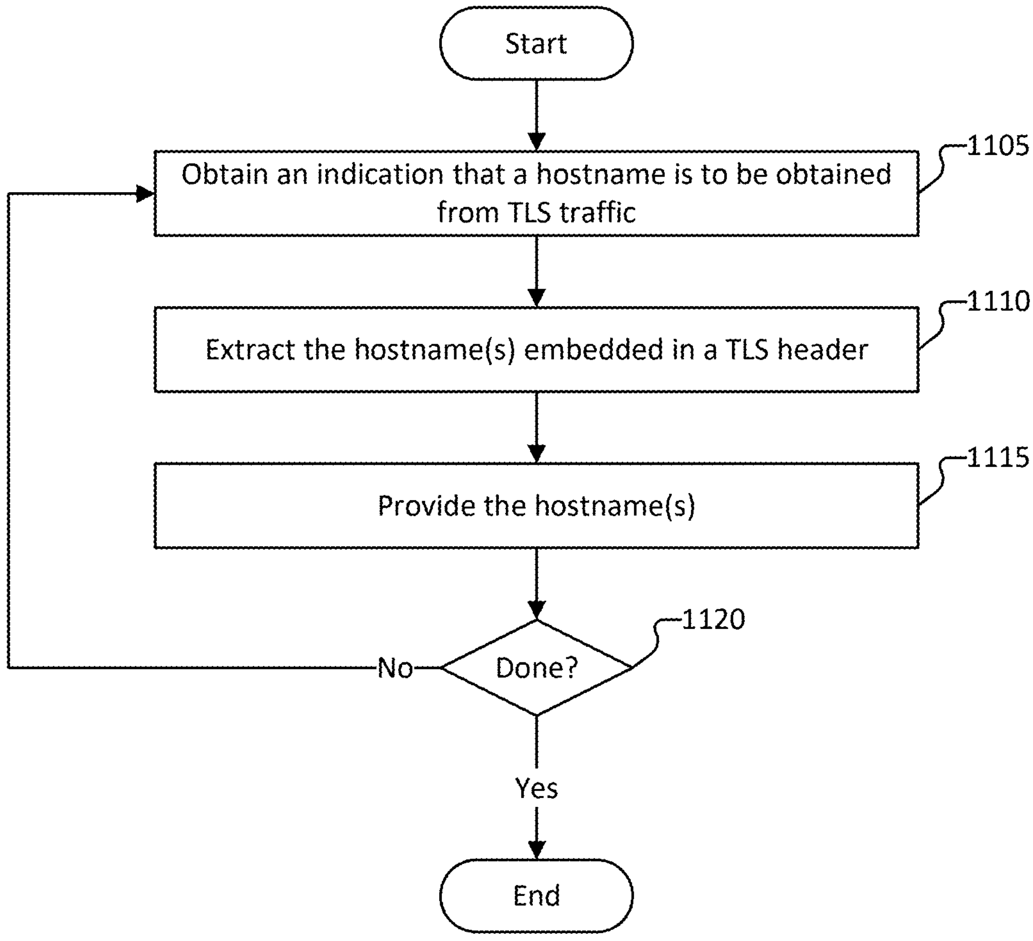
FIG. 11 is a flow diagram of a method for obtaining a hostname embedded in TLS network according to various embodiments.

FIG. 11 is a flow diagram of a method for obtaining a hostname embedded in TLS network according to various embodiments. In some embodiments, process 1100 is implemented at least in part by system 100 of FIG. 1 and/or system 500 of FIG. 5. Process 1100 may be implemented by a system (e.g., a cloud security platform) providing security service to an inline security entity, such as to a firewall (e.g., a next generation firewall). In some embodiments, process 1100 is implemented by an inline security entity. According to various embodiments, the system or process can handle QUIC traffic in the same or similar manner as TLS traffic.

At 1105, the system obtains an indication that a hostname is to be obtained from TLS traffic. For example, the process, system, or service that invoked process 1100 determined that the traffic to be classified (e.g., the intercepted network traffic) and determined (e.g., identified) the traffic as TLS traffic. At 1110, the system extracts the hostname(s) embedded in a TLS header. In some embodiments, the system extracts the hostname(s) as a server name indication (SNI) in the TLS traffic. For example, hostname is obtained from the information/field used during the TLS handshake process according to TLS protocol that allows a client to specify a hostname to which it is attempting to connect. At 1115, the system provides the hostname(s). For example, the system provides the indication to the process, system, or service that invoked process 1100. In some embodiments, the system is a service running on a security entity or client system (e.g., as client software running on a device to cause the device to be managed according to the enterprise network security policies). The system can provide the indication of the hostname(s) to another service running on the security entity or client system, such as the service that intercepts the network traffic and classifies (or queries other services, such as a cloud security platform for a classification) the network traffic, or a service that coordinates the interception, classification, and handling of the network traffic. At 1120, a determination is made as to whether process 1100 is complete. In some embodiments, process 1100 is determined to be complete in response to a determination that no further hostnames are to be extracted, no further network traffic is to be analyzed/evaluated, (e.g., no further traffic classification predictions are to be generated), an administrator indicates that process 1100 is to be paused or stopped, etc. In response to a determination that process 1100 is complete, process 1100 ends. In response to a determination that process 1100 is not complete, process 1100 returns to 1105.

Figure 12:
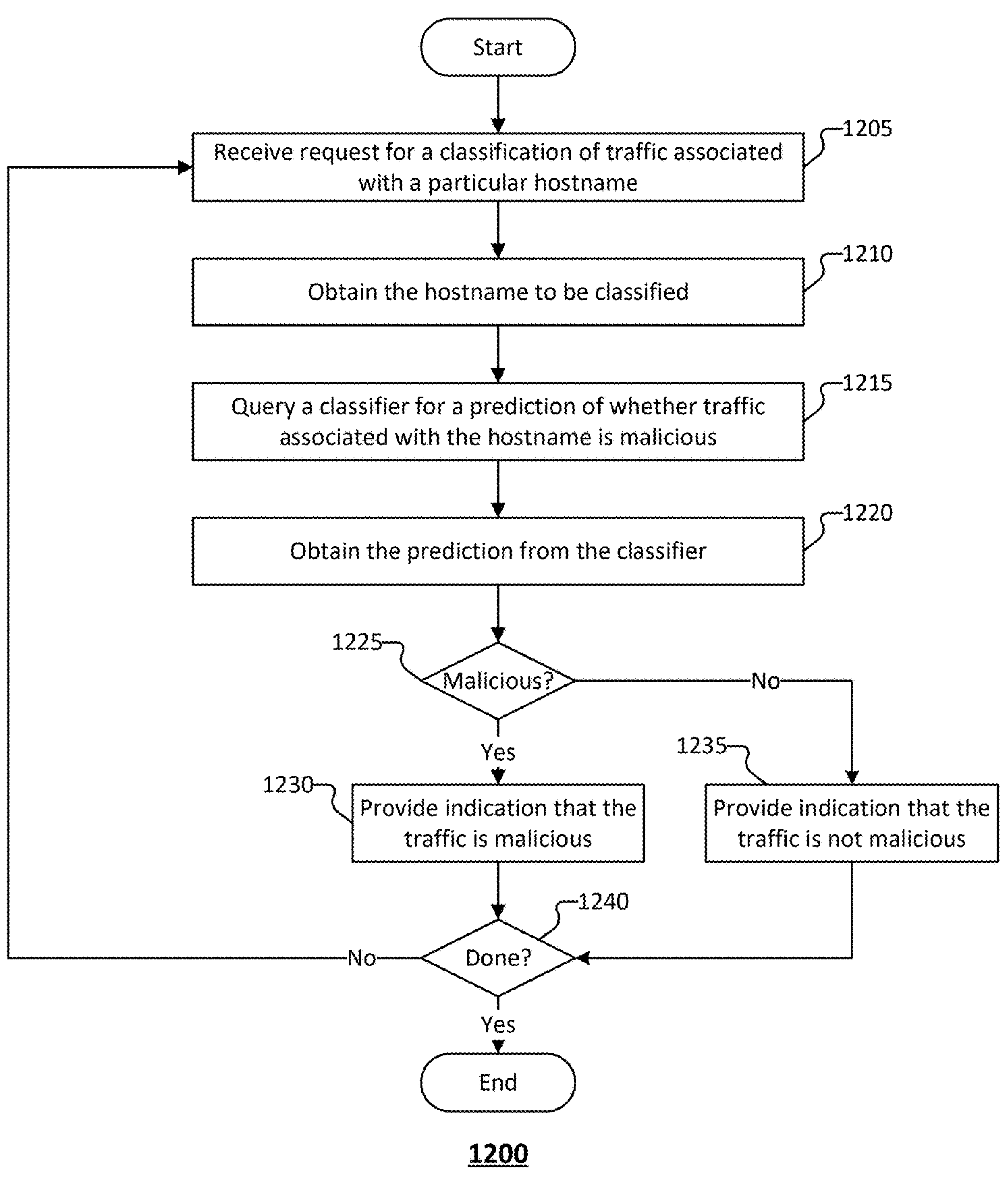
FIG. 12 is a flow diagram of a method for detecting a relayed DNS tunneling attack according to various embodiments.

FIG. 12 is a flow diagram of a method for detecting a relayed DNS tunneling attack according to various embodiments. In some embodiments, process 1200 is implemented at least in part by system 100 of FIG. 1 and/or system 500 of FIG. 5. Process 1200 may be implemented by a system (e.g., a cloud security platform) providing security service to an inline security entity, such as to a firewall (e.g., a next generation firewall). In some embodiments, process 1200 is implemented by an inline security entity.

At 1205, the system receives a request for a classification of traffic associated with a particular host name.

At 1210, the system obtains the hostname to be classified. At 1215, the system queries a classifier for a prediction of whether traffic associated with the hostname is malicious. At 1220, the system obtains the prediction from the classifier. At 1225, the system determines whether the traffic is malicious. The system determines whether the traffic is malicious based at least in part on the prediction. In response to determining that the traffic is malicious, process 1200 proceeds to 1230 at which the system provides an indication that the traffic is malicious. For example, the system provides the indication to the process, system, or service that invoked process 1200. In some embodiments, the system is a cloud security platform that provides the indication to an inline security entity (e.g., a next generation firewall) in connection with a real-time handling of network traffic. Conversely, in response to determining the traffic is not malicious, process 1200 proceeds to 1235 at which the system provides an indication that the traffic is not malicious (e.g., that the traffic is benign). For example, the system provides the indication to the process, system, or service that invoked process 1200. At 1230, a determination is made as to whether process 1200 is complete. In some embodiments, process 1200 is determined to be complete in response to a determination that no further hostnames are to be analyzed (e.g., no further predictions for hostnames are needed), no further network traffic is to be analyzed/evaluated, (e.g., no further traffic classification predictions are to be generated), an administrator indicates that process 1200 is to be paused or stopped, etc. In response to a determination that process 1200 is complete, process 1200 ends. In response to a determination that process 1200 is not complete, process 1200 returns to 1205.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

one or more processors configured to:

obtain web traffic across an enterprise network;

obtain a hostname comprised in the web traffic;

query a security service for a Domain Name System (DNS) tunneling attack verdict based at least in part on the hostname;

determine whether the web traffic is malicious traffic based at least in part on the DNS tunneling attack verdict; and handle the web traffic based at least in part on a determination of whether the web traffic is malicious traffic based at least in part on the DNS tunneling attack verdict; and a memory coupled to the one or more processors and configured to provide the one or more processors with instructions.

2. The system of claim 1, wherein obtaining the web traffic across the enterprise network based on detecting the web traffic based at least in part on an application identifier associated with the web traffic.

3. The system of claim 2, wherein the one or more processors are further configured to:

determine, based at least in part on the application identifier, whether the web traffic is HTTP traffic, HTTPS traffic, or SMTP traffic.

4. The system of claim 1, wherein the web traffic is obtained by a firewall comprised in the enterprise network.

5. The system of claim 1, wherein the web traffic comprises a request and response communicated to/from the enterprise network.

6. The system of claim 1, wherein obtaining the web traffic comprises:

receiving the web traffic; and decrypting the web traffic based at least in part on an SSL decryption.

7. The system of claim 1, wherein obtaining the web traffic comprises:

receiving the web traffic;

determining that the web traffic is encrypted using a non-standard encryption technique; and in response to determining that the web traffic is encrypted using the non-standard encryption technique, deeming the web traffic as malicious or suspicious traffic.

8. The system of claim 7, wherein the non-standard encryption technique is a non-SSL encryption technique.

9. The system of claim 1, wherein obtaining the hostname comprised in the web traffic comprises:

extracting the hostname from metadata associated with the web traffic.

10. The system of claim 1, wherein the security service comprises a DNS cloud service.

11. The system of claim 1, wherein handling the web traffic based at least in part on the determination of whether the web traffic malicious comprises:

blocking the web traffic in response to determining that the web traffic is malicious.

12. The system of claim 1, wherein the security service returns the DNS tunneling verdict in response in response to processing the query based at least in part on the hostname.

13. The system of claim 1, wherein the DNS tunneling attack verdict is generated in near real time with interception of the web traffic by a firewall.

14. The system of claim 1, wherein the one or more processors are further configured to:

provide a notification to an administrator for the enterprise network in response to determining that the web traffic is malicious.

15. The system of claim 14, wherein the notification indicates one or more hosts compromised with an exploit associated with the web traffic.

16. The system of claim 1, wherein:

obtaining the hostname comprised in the web traffic comprises:

extracting header information from HTTP or HTTP web traffic; and the header information comprises the hostname.

17. The system of claim 1, wherein:

obtaining the hostname comprised in the web traffic comprises:

extracting header information from SMTP web traffic; and the header information comprises the hostname.

18. The system of claim 1, wherein:

obtaining the hostname comprised in the web traffic comprises:

extracting information from an Server Name Indication (SNI) field from TLS web traffic; and the information extracted from the SNI field comprises the hostname.

19. The system of claim 1, wherein the DNS tunneling attack verdict indicates whether the hostname corresponds to a relayed DNS tunneling attack.

20. The system of claim 1, wherein the security service comprises a DNS cloud service that includes a DNS tunneling detector configured to generate the DNS tunneling attack verdict based at least in part on the hostname.

21. The system of claim 1, wherein the one or more processors are further configured to:

determine that the web traffic corresponds to a relayed DNS tunneling attack that abuses a reputable web service or an internal web service as a proxy to route DNS tunneling requests toward an attacker-controlled nameserver.

22. A method, comprising:

obtaining web traffic across an enterprise network;

obtaining a hostname comprised in the web traffic;

querying a security service for a Domain Name System (DNS) tunneling attack verdict based at least in part on the hostname;

determining whether the web traffic is malicious traffic based at least in part on the DNS tunneling attack verdict; and handling the web traffic based at least in part on a determination of whether the web traffic is malicious traffic based at least in part on the DNS tunneling attack verdict.

23. A computer program product embodied in a non-transitory computer readable medium and comprising computer instructions for:

obtaining web traffic across an enterprise network;

obtaining a hostname comprised in the web traffic;

querying a security service for a Domain Name System (DNS) tunneling attack verdict based at least in part on the hostname;

determining whether the web traffic is malicious traffic based at least in part on the DNS tunneling attack verdict; and handling the web traffic based at least in part on a determination of whether the web traffic is malicious traffic based at least in part on the DNS tunneling attack verdict.

* * * * *